US010645535B2

(12) United States Patent
Ueno et al.

(10) Patent No.: US 10,645,535 B2
(45) Date of Patent: *May 5, 2020

(54) ELECTRONIC APPARATUS, CONTROL DEVICE AND COMPUTER-READABLE NON-TRANSITORY RECORDING MEDIUM FOR SELECTIVELY TRANSMITTING INFORMATION BASED ON INDOOR/OUTDOOR SPECIFICATION

(71) Applicant: KYOCERA Corporation, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,303

(22) Filed: May 20, 2019

(65) Prior Publication Data

US 2019/0274009 A1    Sep. 5, 2019

Related U.S. Application Data

(63) Continuation of application No. PCT/JP2017/040691, filed on Nov. 13, 2017.

(30) Foreign Application Priority Data

Nov. 25, 2016   (JP) .................................. 2016-229298

(51) Int. Cl.
*H04W 4/029* (2018.01)
*H04W 4/02* (2018.01)
(Continued)

(52) U.S. Cl.
CPC .............. *H04W 4/029* (2018.02); *G08G 1/01* (2013.01); *G08G 1/09* (2013.01); *G08G 1/16* (2013.01);
(Continued)

(58) Field of Classification Search
CPC ..... H04W 4/023; H04W 4/027; H04W 64/00; H04W 4/33; H04W 4/021; H04W 4/025;
(Continued)

(56) References Cited

U.S. PATENT DOCUMENTS 6,233,448 B1 * 5/2001 Alperovich ....... H04M 3/42229
                                                          455/414.1
2009/0199291 A1   8/2009 Hayasaka et al.
(Continued)

FOREIGN PATENT DOCUMENTS

EP         2327995 A2    6/2011
EP         2680039 A1    1/2014
(Continued)

OTHER PUBLICATIONS

Qualcomm Incorporated, "Updates to Vulnerable Road User (VRU) use cases", 3GPP TSG-SA WG1 Meeting #72, S1-154434, Nov. 16-20, 2015, pp. 1-7, Anaheim, CA, USA.

*Primary Examiner* — Daniel Lai
(74) *Attorney, Agent, or Firm* — Studebaker & Brackett PC

(57) ABSTRACT

A communication unit can perform a wireless communication with a plurality of communication devices each transmitting allocated identification information. A storage stores, as registered positional information, positional information indicating a position of a first communication device included in the plurality of the communication devices or a position of the electronic apparatus at a time when the communication unit receives the identification information (Continued)

transmitted from the first communication device. A first determiner determines whether or not a position of a second communication device included in the plurality of the communication devices or a position of the electronic apparatus at a time when the communication unit receives the identification information transmitted from the second communication device is located within a predetermined range from the position indicated by the registered positional information in a case where the communication unit receives the identification information transmitted from the second communication device. An indoor specifying unit performs an indoor specification for specifying that a user of the electronic apparatus is located indoors based on a determination result in the first determiner.

18 Claims, 13 Drawing Sheets

(51) Int. Cl.
| | | |
|---|---|---|
| *H04W 4/40* | (2018.01) | |
| *H04W 4/33* | (2018.01) | |
| *H04W 4/44* | (2018.01) | |
| *H04W 4/90* | (2018.01) | |
| *H04M 1/00* | (2006.01) | |
| *H04W 64/00* | (2009.01) | |
| *G08G 1/01* | (2006.01) | |
| *G08G 1/09* | (2006.01) | |
| *H04W 48/04* | (2009.01) | |
| *G08G 1/16* | (2006.01) | |

(52) U.S. Cl.
CPC ............... *H04M 1/00* (2013.01); *H04W 4/02* (2013.01); *H04W 4/33* (2018.02); *H04W 4/40* (2018.02); *H04W 4/44* (2018.02); *H04W 4/90* (2018.02); *H04W 48/04* (2013.01); *H04W 64/00* (2013.01)

(58) Field of Classification Search
CPC ... H04W 64/003; H04W 16/20; H04W 4/024; H04W 4/48; H04W 4/44; H04W 4/90; H04W 84/12; H04W 4/029; H04W 4/02; H04W 48/04; G01C 21/206; G01C 21/12; G01C 21/20; G01C 21/30; H04M 1/00; G08G 1/01; G08G 1/09; G08G 1/16; G08G 1/012

See application file for complete search history.

(56) References Cited

U.S. PATENT DOCUMENTS

| | | |
|---|---|---|
| 2012/0157128 A1 | 6/2012 | Aust et al. |
| 2012/0252495 A1 | 10/2012 | Moeglein et al. |
| 2013/0137450 A1 | 5/2013 | Dai et al. |
| 2014/0179298 A1 | 6/2014 | Grokop et al. |
| 2014/0274114 A1 | 9/2014 | Rowitch |
| 2014/0341061 A1 | 11/2014 | Shinada et al. |
| 2015/0153437 A1 | 6/2015 | Baumgartner et al. |
| 2015/0220817 A1 | 8/2015 | Kujirai |
| 2015/0247917 A1* | 9/2015 | Gum ..................... H04W 4/029 342/452 |
| 2016/0080911 A1 | 3/2016 | Kay et al. |
| 2016/0165396 A1 | 6/2016 | Wirola et al. |
| 2016/0198431 A1* | 7/2016 | Pattabiraman ...... H04W 64/006 455/414.2 |
| 2016/0306338 A1 | 10/2016 | Morita |
| 2017/0094541 A1* | 3/2017 | Ngai ....................... H04W 4/33 |
| 2017/0142739 A1* | 5/2017 | Fang ....................... H04W 4/70 |
| 2017/0150490 A1* | 5/2017 | Chen ..................... H04B 1/3822 |

FOREIGN PATENT DOCUMENTS

| | | |
|---|---|---|
| JP | 2003-258942 A | 9/2003 |
| JP | 2009188771 A | 8/2009 |
| JP | 2010250680 A | 11/2010 |
| JP | 2011049931 A | 3/2011 |
| JP | 2014508285 A | 4/2014 |
| JP | 2014123847 A | 7/2014 |
| JP | 2015148847 A | 8/2015 |
| JP | 2016005228 A | 1/2016 |
| JP | 2016506668 A | 3/2016 |
| JP | 2016519756 A | 7/2016 |
| JP | 2016-163186 A | 9/2016 |
| JP | 2016158118 A | 9/2016 |
| WO | 2013128613 A1 | 9/2013 |
| WO | 2015/064662 A1 | 5/2015 |

\* cited by examiner

ELECTRONIC APPARATUS, CONTROL DEVICE AND COMPUTER-READABLE NON-TRANSITORY RECORDING MEDIUM FOR SELECTIVELY TRANSMITTING INFORMATION BASED ON INDOOR/OUTDOOR SPECIFICATION

CROSS-REFERENCE TO RELATED APPLICATION

The present application is a continuation based on PCT Application No. PCT/JP2017/040691 filed on Nov. 13, 2017, which claims the benefit of Japanese Application No. 2016-229298, filed on Nov. 25, 2016. PCT Application No. PCT/JP2017/040691 is entitled "ELECTRONIC DEVICE, CONTROL DEVICE AND CONTROL PROGRAM", and Japanese Application No. 2016-229298 is entitled "ELECTRONIC APPARATUS, CONTROL DEVICE, CONTROL PROGRAM, AND METHOD FOR OPERATING ELECTRONIC APPARATUS". The contents of which are incorporated by reference herein in their entirety.

FIELD

The present disclosure relates to electronic apparatuses.

BACKGROUND

Various techniques relating to electronic apparatuses are proposed.

SUMMARY

An electronic apparatus, control device and computer-readable non-transitory recording medium are disclosed. In one embodiment, an electronic apparatus comprises a communication unit, a storage, and at least one processor. A communication unit can perform a wireless communication with a plurality of communication devices each transmitting allocated identification information. A storage stores, as registered positional information, positional information indicating a position of a first communication device included in the plurality of the communication devices or a position of the electronic apparatus at a time when the communication unit receives the identification information transmitted from the first communication device. The at least one processor performs determination processing of determining whether or not a position of a second communication device included in the plurality of the communication devices or a position of the electronic apparatus at a time when the communication unit receives the identification information transmitted from the second communication device is located within a predetermined range from the position indicated by the registered positional information in a case where the communication unit receives the identification information transmitted from the second communication device. The at least one processor performs an indoor specification for specifying that a user of the electronic apparatus is located indoors based on a determination result in the determination processing.

In one embodiment, a control device is a control device included in an electronic apparatus, which can perform a wireless communication with a plurality of communication devices each transmitting allocated identification information, for controlling an operation of the electronic apparatus. The electronic apparatus stores, as registered positional information, positional information indicating a position of a first communication device included in the plurality of the communication devices or a position of the electronic apparatus at a time when the electronic apparatus receives the identification information transmitted from the first communication device. A control device comprises at least one processor. The at least one processor performs determination processing of determining whether or not a position of a second communication device included in the plurality of the communication devices or a position of the electronic apparatus at a time when the electronic apparatus receives the identification information transmitted from the second communication device is located within a predetermined range from the position indicated by the registered positional information in a case where the electronic apparatus receives the identification information transmitted from the second communication device. The at least one processor performs an indoor specification for specifying that a user of the electronic apparatus is located indoors based on a determination result in the determination processing.

In one embodiment, a computer-readable non-transitory recording medium stores a control program for controlling an electronic apparatus which can perform a wireless communication with a plurality of communication devices each transmitting allocated identification information. The electronic apparatus stores, as registered positional information, positional information indicating a position of a first communication device included in the plurality of the communication devices or a position of the electronic apparatus at a time when the electronic apparatus receives the identification information transmitted from the first communication device. A control program makes the electronic apparatus execute: determination processing of determining whether or not a position of a second communication device included in the plurality of the communication devices or a position of the electronic apparatus at a time when the electronic apparatus receives the identification information transmitted from the second communication device is located within a predetermined range from the position indicated by the registered positional information in a case where the electronic apparatus receives the identification information transmitted from the second communication device; and an indoor specification for specifying that a user of the electronic apparatus is located indoors based on a determination result in the determination processing.

In one embodiment, an operation method of the electronic apparatus is an operation method of the electronic apparatus which can perform a wireless communication with a plurality of communication devices each transmitting allocated identification information. The electronic apparatus stores, as registered positional information, positional information indicating a position of a first communication device included in the plurality of the communication devices or a position of the electronic apparatus at a time when the electronic apparatus receives the identification information transmitted from the first communication device. An operation method of the electronic apparatus comprises: determining whether or not a position of a second communication device included in the plurality of the communication devices or a position of the electronic apparatus at a time when the electronic apparatus receives the identification information transmitted from the second communication device is located within a predetermined range from the position indicated by the registered positional information in a case where the electronic apparatus receives the identification information transmitted from the second communication device; and performing an indoor specification for specifying that a user of the electronic apparatus is located indoors based on a determination result in the determination processing.

DETAILED DESCRIPTION

Figure 1:
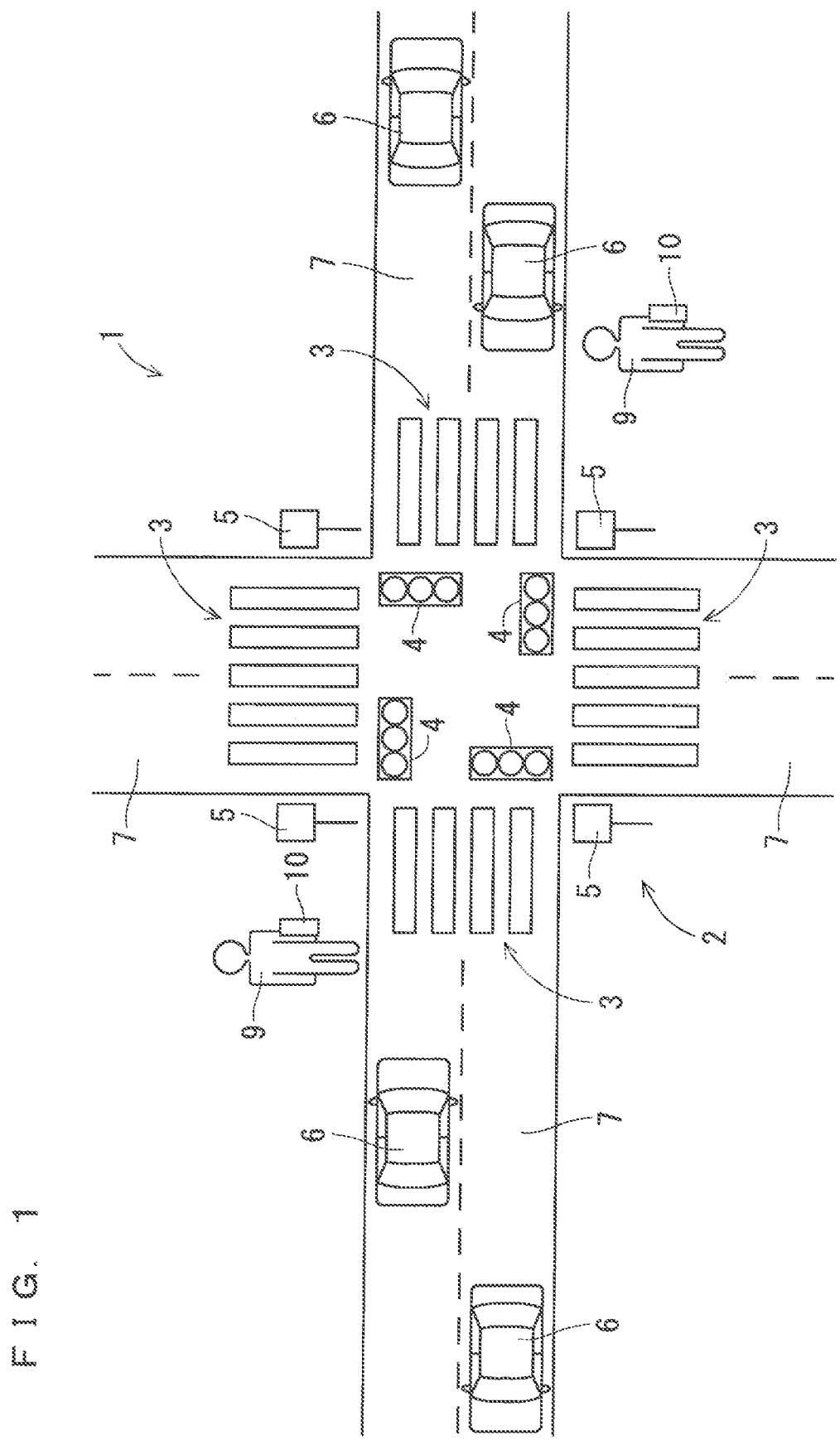
FIG. 1 illustrates a diagram showing one example of a system in which an electronic apparatus is used.

FIG. 1 is a diagram showing one example of a system in which an electronic apparatus 10 is used. The electronic apparatus 10 is, for example, a mobile phone such as a smartphone. The electronic apparatus 10 can be used in intelligent transport systems (ITS), for example. Specifically, the electronic apparatus 10 can be used in a safe driving support communication system 1 of the ITS. The safe driving support communication system 1 is also referred to as a safe driving support system or a safe driving support wireless system.

As illustrated in FIG. 1, in the safe driving support communication system 1, a roadside unit 5 disposed in an intersection 2, for example, a vehicle 6 such as an automobile traveling along a roadway 7, and the electronic apparatus 10 held by a user 9 who is a pedestrian can perform a wireless communication with each other. Thus, the roadside unit 5, the vehicle 6, and the electronic apparatus 10 can exchange information. A plurality of vehicles 6 can perform a wireless communication with each other. Thus, the plurality of vehicles 6 can exchange information. A communication between the roadside unit 5 and the vehicle 6, a communication between the vehicles 6, a communication between the roadside unit 5 and the electronic apparatus 10 of the pedestrian, and a communication between the electronic apparatus 10 of the pedestrian and the vehicle 6 are referred to as a road-to-vehicle communication, an inter-vehicle communication, a road-to-pedestrian communication, and a pedestrian-to-vehicle communication, respectively.

The roadside unit 5 can notify the vehicle 6 and the electronic apparatus 10 of information regarding a lighting of a traffic light 4 and information regarding a highway regulation, for example. The roadside unit 5 can detect the vehicle 6 and a pedestrian near the roadside unit 5. The roadside unit 5 disposed in the intersection 2 can detect a pedestrian crossing at a crosswalk 3, for example. Then, the roadside unit 5 can notify the vehicle 6 and the electronic apparatus 10 of information regarding the detected vehicle 6 and pedestrian. The roadside unit 5 can notify the other vehicle 6 and the other electronic apparatus 10 of information notified by the vehicle 6 and the electronic apparatus 10.

The vehicle 6 can notify the other vehicle 6, the roadside unit 5, and the electronic apparatus 10 of information regarding an indicator of the vehicle 6, a position of the vehicle 6, and a speed of the vehicle 6, for example. Then, the vehicle 6 can support safe driving of a driver by transmitting various notifications such as a caution, based on the notified information, to the driver. The user 6 can transmit the various notifications to the driver using a speaker and a display device, for example. The vehicle 6 can transmit the various notifications to the driver using a car navigation device mounted on the vehicle 6, for example.

The electronic apparatus 10 can specify a state of the user 9 of the electronic apparatus 10. The electronic apparatus 10 can notify the roadside unit 5, for example, of information regarding the specified state of the user 9. An operation of the electronic apparatus 10 is described in detailed hereinafter.

As described above, the safe driving support communication system 1 performs the road-to-vehicle communication, the inter-vehicle communication, the road-to-pedestrian communication, and the pedestrian-to-vehicle communication, thereby supporting the safe driving of the driver of the vehicle 6.

The example in FIG. 1 illustrates a vehicle of an automobile as the vehicle 6, however, the vehicle 6 may be a vehicle other than the automobile. For example, the vehicle 6 may be a vehicle of a bus or a vehicle of a light rail system. The electronic apparatus 10 can also be used in a system other than the safe driving support communication system 1.

One Example of External Appearance of Electronic Apparatus

Figure 2:
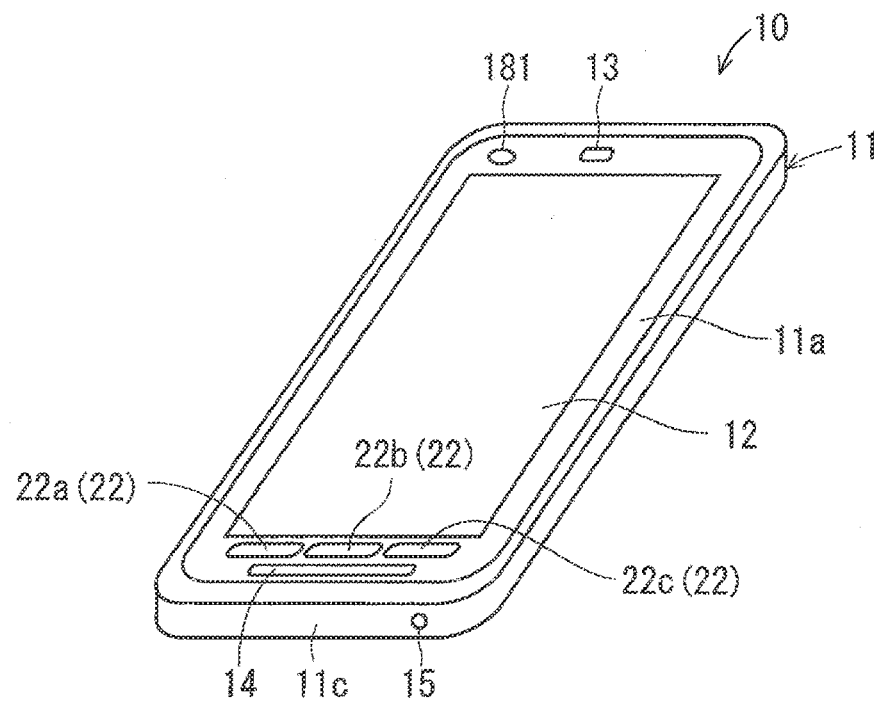
FIG. 2 illustrates a perspective view showing one example of an external appearance of an electronic apparatus.
Figure 3:
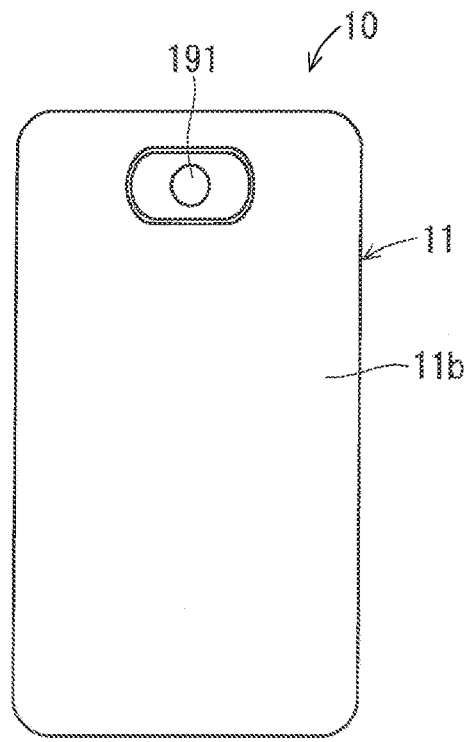
FIG. 3 illustrates a rear view showing one example of the external appearance of the electronic apparatus.

FIGS. 2 and 3 are a perspective view and a rear view showing one example of an external appearance of the electronic apparatus 10, respectively. As illustrated in FIGS. 1 and 2, the electronic apparatus 10 comprises an apparatus case 11 having a plate shape substantially rectangular in a plan view. The apparatus case 11 constitutes an exterior of the electronic apparatus 10.

A display region 12, in which various types of information such as characters, symbols, and graphics are displayed, is located in a front surface 11a of the apparatus case 11. A touch panel 130, which will be described below, is located in a rear surface side of the display region 12. Accordingly, the user 9 can input various types of information to the electronic apparatus 10 by operating the display region 12 in the front surface of the electronic apparatus 10 with his/her finger, for example. The user 9 can also input the various types of information to the electronic apparatus 10 by operating the display region 12 with a pen for the touch panel such as a stylus pen, for example, instead of an operator such as his/her finger.

A receiver hole 13 is located in an upper end of the front surface 11a of the apparatus case 11. A speaker hole 14 is located in a lower end of the front surface 11a. A microphone hole 15 is located in a side surface 11c in a lower side of the apparatus case 11.

A lens 181 included in a first camera 180, which will be described below, can be visually recognized from the upper end of the front surface 11a of the apparatus case 11. As illustrated in FIG. 3, a lens 191 included in a second camera 190, which will be described below, can be visually recognized from an upper end of a rear surface 11b of the apparatus case 11.

The electronic apparatus 10 comprises an operation button group 220 including a plurality of operation buttons 22 (refer to FIG. 4 described below). Each of the plurality of the operation buttons 22 is a hardware button, for example. Specifically, each of the plurality of the operation buttons 22 is a press button. At least one operation button 22 included in the operation button group 220 may also be a software button displayed in the display region 12.

The operation button group 220 includes operation buttons 22a, 22b, and 22c located in the lower end of the front surface 11a of the apparatus case 11. The operation button group 220 includes a power button and a volume button located in a surface of the apparatus case 11.

The operation button 22a is a back button, for example. The back button is an operation button for switching a display in the display region 12 to an immediately preceding display. The user 9 operates the operation button 22a to switch the display in the display region 12 to the immediately preceding display. The operation button 22b is a home button, for example. The home button is an operation button for displaying a home screen in the display region 12. The user 9 operates the operation button 22b to display the home screen in the display region 12. The operation button 22c is a history button, for example. The history button is an operation button to display a history of an application executed by the electronic apparatus 10 in the display region 12. When the user 9 operates the operation button 22c, the history of the application executed by the electronic apparatus 10 is displayed in the display region 12.

One Example of Electrical Configuration of Electronic Apparatus

Figure 4:
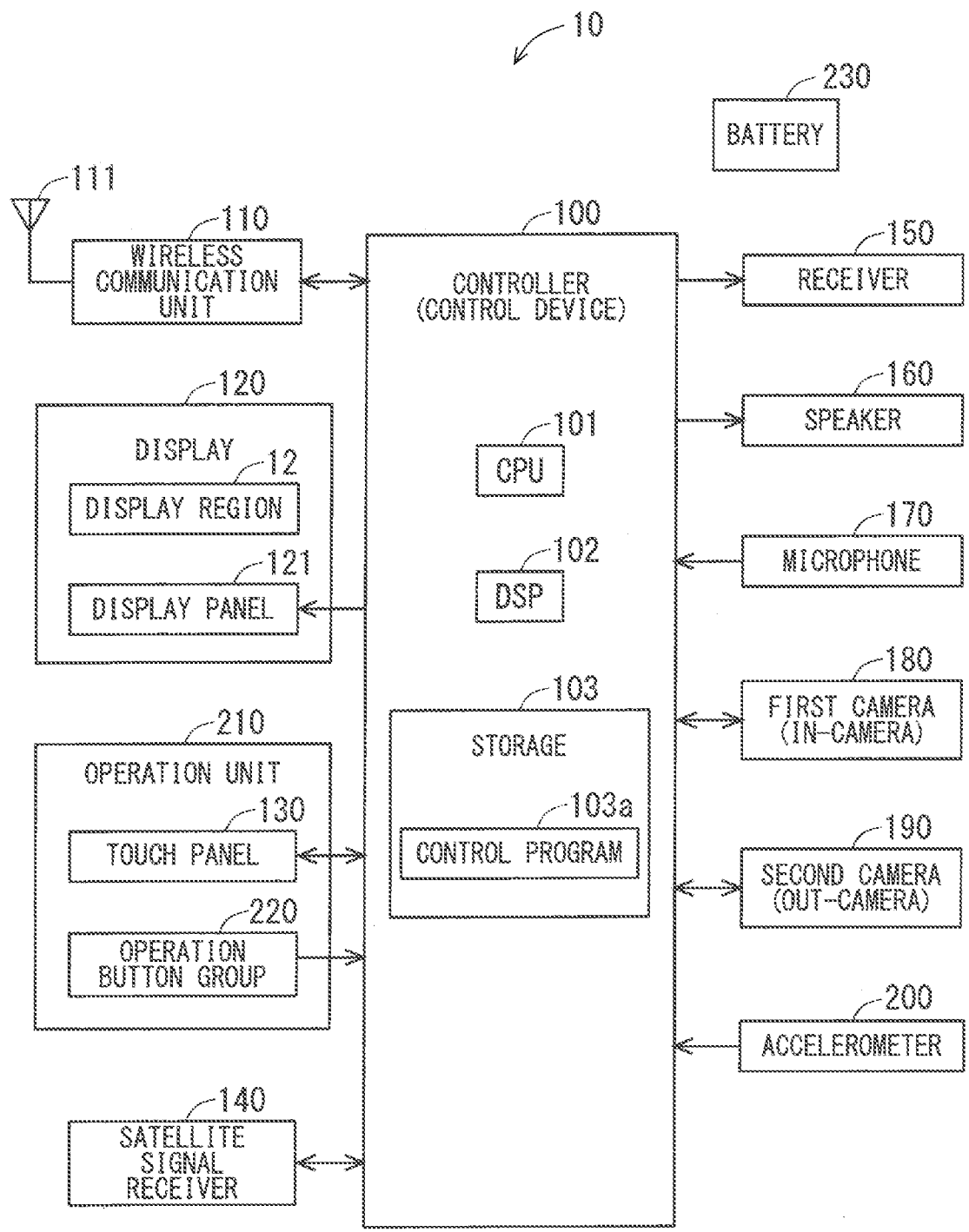
FIG. 4 illustrates a block diagram showing one example of a configuration of the electronic apparatus.

FIG. 4 is a block diagram mainly showing one example of an electrical configuration of the electronic apparatus 10. As illustrated in FIG. 4, the electronic apparatus 10 comprises a controller 100, a wireless communication unit 110, a display 120, an operation unit 210, and a satellite signal receiver 140. The electronic apparatus further comprises a receiver 150, a speaker 160, a microphone 170, the first camera 180, the second camera 190, an accelerometer 200, and a battery 230. The apparatus case 11 houses these components included in the electronic apparatus 10.

The controller 100 controls the other components of an electronic apparatus 10 to be able to collectively manage the operation of the electronic apparatus 10. The controller 100 is also considered as a control device. The controller 100 includes at least one processor for providing control and processing capability to execute various functions as described in detail below.

In accordance with various embodiments, the at least one processor may be executed as a single integrated circuit (IC) or as multiple communicatively coupled IC's and/or discrete circuits. The at least one processor can be executed in accordance with various known techniques.

In one embodiment, the processor includes one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

In the present example, the controller 100 comprises a central processing unit (CPU) 101, a digital signal processor (DSP) 102, and a storage 103. The storage 103 includes a non-transitory recording medium readable by the CPU 101 and the DSP 102 such as a read only memory (ROM) and a random access memory (RAM). The ROM of the storage 103 is, for example, a flash ROM (flash memory) that is a non-volatile memory. The storage 103 stores a plurality of control programs 103a to control the electronic apparatus 10. The CPU 101 and the DSP 102 execute the various control programs 103a in the storage 103 to achieve various functions of the controller 100.

A configuration of the controller 100 is not limited to the example in FIG. 4. For example, the controller 100 may comprise a plurality of CPUs 101. In this case, the controller 100 may comprise a main CPU performing comparative complex processing and a sub CPU performing comparative simple processing. It is also applicable that the controller 100 does not comprise the DSP 102 or comprises a plurality of DSPs 102. All or some of the functions of the controller 100 may be achieved by a hardware circuit that needs no software to achieve the functions above.

The storage 103 may comprise a non-transitory computer readable recording medium other than the ROM and the RAM. The storage 103 may comprise, for example, a compact hard disk drive and a solid state drive (SSD).

The plurality of control programs 103a in the storage 103 include various applications (application programs). The storage 103 stores, for example, a call application to perform a voice call and a video call, a browser to display a website, and a mail application to create, browse, send, and receive an e-mail. The storage 103 also stores a camera application to take a picture of an object using the first camera 180 and the second camera 190, a recorded image display application to display a still image and a video recorded in the storage 103, and a music reproduction control application to control a reproduction of music data stored in the storage 103. The storage 103 may store at least one application in the storage 103 in advance. The electronic apparatus 10 may download the at least one application in the storage 103 from the other device and store it in the storage 103.

The wireless communication unit 110 comprises an antenna 111. The wireless communication unit 110 can perform a wireless communication in several types of communication systems, for example, using the antenna 111. The controller 100 controls the wireless communication of the wireless communication unit 110.

The wireless communication unit 110 can perform a wireless communication with a base station of a mobile phone system. The wireless communication unit 110 can communicate with a mobile phone different from the electronic apparatus 10 or a web server via a network such as the base station or Internet. The electronic apparatus 10 can perform a data communication, a voice call, and a video call with the other mobile phone, for example.

The wireless communication unit 110 can perform a wireless communication with the roadside unit 5 and the vehicle 6. The wireless communication unit 110 can perform a wireless communication using the wireless local area network (LAN) such as Wifi. The wireless communication unit 110 can perform a near field wireless communication. For example, the wireless communication unit 110 can perform the wireless communication in conformity to Bluetooth (registered trademark). The wireless communication unit 110 may perform the wireless communication in conformity to at least one of ZigBee (registered trademark) and near field communication (NFC).

The wireless communication unit 110 can perform various types of processing such as amplification processing on a signal received by the antenna 111 and then outputs a resultant signal to the controller 100. The controller 100 can perform the various types of processing on the received signal which has been input, to obtain information contained in the received signal. The controller 100 outputs a transmission signal containing the information to the wireless communication unit 110. The wireless communication unit 110 can perform the various types of processing such as amplification processing on the transmission signal being has been input, and then wirelessly transmits a resultant signal from the antenna 111.

The display 120 comprises the display region 12 located in the front surface of the electronic apparatus 10 and a display panel 121. The display 120 can display various types of information in the display region 12. The display panel 121 is a liquid crystal display panel or an organic EL panel, for example. The display panel 121 can display various types of information such as characters, symbols, and graphics under control of the controller 100. The display panel 121 faces the display region 12 in the apparatus case 11. The information displayed on the display panel 121 is displayed in the display region 12.

The operation unit 210 can receive various operations performed by the user 9 on the electronic apparatus 10. The operation unit 210 comprises the touch panel 130 and the operation button group 220.

The touch panel 130 can detect an operation performed on the display region 12 with the operator such as the finger. Accordingly, the touch panel 130 can receive the operation performed by the user 9 on the display region 12. The touch panel 130 is, for example, a projected capacitive touch panel. The touch panel 130 is located on a back side of the display region 12, for example. When the user 9 performs the operation on the display surface 12 with the operator such as his/her finger, the touch panel 130 can input, to the controller 100, an electrical signal corresponding to the operation. The controller 100 can specify contents of the operation performed on the display region 12 based on an electrical signal being output from the touch panel 130. The controller 100 can perform the processing corresponding to the specified operation contents.

When the user 9 operates each operation button 22 of the operation button group 220, the operation button 22 can output to the controller 100 an operation signal indicating that the operation button 22 has been operated. The controller 100 can accordingly determine whether or not each operation button 22 has been operated for each operation button 22. The controller 100 to which the operation signal is input controls the other component, thereby causing the electronic apparatus 10 to execute the function allocated to the operated operation button 22.

The satellite signal receiver 140 can receive a satellite signal transmitted by a positioning satellite. Then, the satellite signal receiver 140 can obtain positional information indicating a position of the electronic apparatus 10 based on the received satellite signal. The positional information obtained by the satellite signal receiver 140 includes a latitude and a longitude indicating a position of the electronic apparatus 10, for example. The controller 100 can operate the satellite signal receiver 140 and stop the operation thereof. The satellite signal receiver 140 may be simply referred to as "the receiver 140" in some cases hereinafter.

The receiver 140 is a GPS (global positioning system) receiver, for example, and can receive a wireless signal from the positioning satellite of a GPS. The receiver 140 calculates a current position of the electronic apparatus 10 with a latitude and a longitude, for example, based on the received wireless signal, and outputs the positional information including the calculated latitude and longitude to the controller 100. The positional information of the electronic apparatus 10 is also considered as positional information indicating the position of the user 9 holding the electronic apparatus 10.

The receiver 140 may obtain the positional information of the electronic apparatus 10 based on the signal transmitted by the positioning satellite of global navigation satellite system (GNSS) other than GPS. For example, the receiver 140 may obtain the positional information of the electronic apparatus 10 based on a signal transmitted by a positioning satellite of global navigation satellite system (GLONASS), Indian regional navigational satellite system (IRNSS), COMPASS, Galileo, or quasi-zenith satellites system (QZSS).

The microphone 170 can convert a sound being input from the outside of the electronic apparatus 10 into an electrical sound signal and then output the electrical sound signal to the controller 100. The sound from the outside of the electronic apparatus 10 is taken inside the electronic apparatus 10 through the microphone hole 15 and input to the microphone 170.

The speaker 160 is, for example, a dynamic speaker. The speaker 160 can convert an electrical sound signal from the controller 100 into a sound and then output the sound. The sound being output from the speaker 160 is output outside through the speaker hole 14. The user 9 can hear the sound being output from the speaker hole 14 in a place apart from the electronic apparatus 10.

The receiver 150 can output a received sound. The receiver 150 is, for example, a dynamic speaker. The receiver 150 can convert an electrical sound signal from the controller 100 into a sound and then output the sound. The sound being output from the receiver 150 is output outside through the receiver hole 13. A volume of the sound being output through the receiver hole 13 is set to be smaller than a volume of the sound being output through the speaker hole 14. The user 9 brings the receiver hole 13 close to his/her ear, thereby being able to hear the sound being output through the receiver hole 13. A vibration element such as a piezoelectric vibration element for causing a portion of the front surface of the apparatus case 11 to vibrate may be provided instead of the receiver 150. In this case, the sound is transmitted to the user in a form of the vibration of the portion of the front surface.

The first camera 180 comprises the lens 181, an image sensor, and so on. The second camera 190 comprises the lens 191, an image sensor, and so on. Each of the first camera 180 and the second camera 190 can take an image of an object under control of the controller 100, generate a still image or a video of the object, and then output the still image or the video to the controller 100.

The lens 181 of the first camera 180 can be visually recognized from the front surface 11a of the apparatus case 11. Accordingly, the first camera 180 can take an image of an object located on a front surface side (in other words, a display region 12 side) of the electronic apparatus 10. The first camera 180 is referred to as an in-camera. In the meanwhile, the lens 191 of the second camera 190 can be visually recognized from the rear surface 11b of the apparatus case 11. Accordingly, the second camera 190 can take an image of an object located on a rear surface side of the electronic apparatus 10. The second camera 190 is referred to as an out-camera.

The accelerometer 200 can detect an acceleration of the electronic apparatus 10. The accelerometer 200 is a three-axis accelerometer, for example. The accelerometer 200 can detect an acceleration of the electronic apparatus 10 in an x axis direction, a y axis direction and a z axis direction. The x axis direction, the y axis direction, and the z axis direction are set to a longitudinal direction, a short-side direction, and a thickness direction of the electronic apparatus 10, respectively, for example.

The battery 230 can output a power source for the electronic apparatus 10. The battery 230 is, for example, a rechargeable battery. The battery 230 can supply the power source to various components such as the controller 100 and the wireless communication unit 110 included in the electronic apparatus 10.

It is also applicable that the electronic apparatus 10 does not comprise the accelerometer 200. In this case, the electronic apparatus 10 may have a wireless or wired connection with the accelerometer separated from the electronic apparatus 10.

The electronic apparatus 10 may comprise a sensor other than the accelerometer 200. For example, the electronic apparatus 10 may comprise at least one of an atmospheric pressure sensor, a geomagnetic sensor, a temperature sensor, a proximity sensor, an illuminance sensor, and a gyro sensor. The electronic apparatus 10 may have a wireless or wired connection with a sensor other than the accelerometer 200 separated from the electronic apparatus 10.

It is also applicable that the electronic apparatus 10 does not comprise the receiver 140. In this case, the electronic apparatus 10 may have a wireless or wired connection with the receiver 140 separated from the electronic apparatus 10.

One Example of Function Block in Controller

Figure 5:
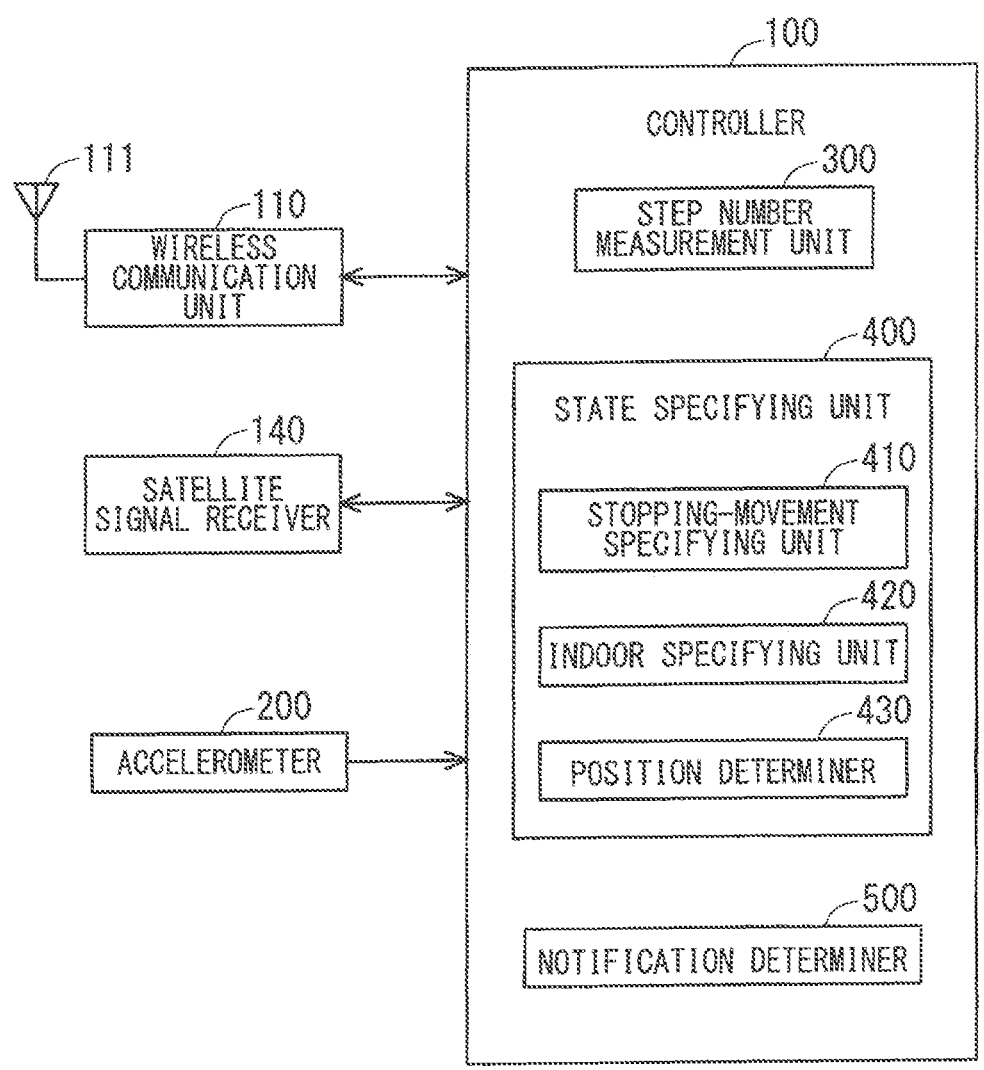
FIG. 5 illustrates a block diagram showing one example of a configuration of a controller.

FIG. 5 is a drawing showing one example of some of function blocks formed when the CPU 101 and the DSP 102 execute a control program 103a in the storage 103.

As illustrated in FIG. 5, the controller 100 comprises a step number measurement unit 300, a state specifying unit 400, and a notification determiner 500 as the function blocks. At least one of the step number measurement unit 300, the state specifying unit 400, and the notification determiner 500 may be achieved by a hardware circuit that needs no software to achieve the functions above.

The state specifying unit 400 can specify various states of the user 9. The state specifying unit 400 comprises, for example, a stopping-movement specifying unit 410, an indoor specifying unit 420, and a position determiner 430. At least one of the stopping-movement specifying unit 410, the indoor specifying unit 420, and the position determiner 430 may be achieved by a hardware circuit that needs no software to achieve the functions above.

When the controller 100 comprises a main CPU and a sub CPU, the sub CPU may achieve some function blocks and the main CPU may achieve the remaining function blocks in the plurality of the function blocks illustrated in FIG. 5. For example, the sub CPU may achieve the stopping-movement specifying unit 410 and the main CPU may achieve the remaining function blocks.

The stopping-movement specifying unit 410 can perform a stopping-movement specification for specifying the state of the user 9 regarding the stopping and the movement of the user 9. The stopping-movement specifying unit 410 can specify the user 9 stopping and the user 9 traveling in the stopping-movement specification. In other words, the stopping-movement specifying unit 410 can determine whether the user 9 is in a stopping state or a traveling state. Still in other words, the stopping-movement specifying unit 410 can determine whether or not the user 9 travels. Since the stopping of the user 9 is considered as the stopping of the electronic apparatus 10, the stopping-movement specifying unit 410 is deemed to function as a determiner determining whether or not the electronic apparatus 10 is stopping. The stopping-movement specifying unit 410 can specify the user 9 stopping and the user 9 traveling based on at least one of the positional information obtained by the receiver 140 and the acceleration detected by the accelerometer 200, for example.

The stopping-movement specifying unit 410 can specify the user 9 stopping and the user 9 starting traveling in the stopping-movement specification. The stopping-movement specifying unit 410 determines that the user 9 stops when the state of the user 9 changes from the traveling state to the stopping state. The stopping-movement specifying unit 410 determines that the user 9 starts traveling when the state of the user 9 changes from the stopping state to the traveling state.

The stopping of the user 9 is considered as the stopping of the movement of the electronic apparatus 10, thus the stopping-movement specifying unit 410 is deemed to be able to specify the stopping of the movement of the electronic apparatus 10. The start of the movement of the user 9 is considered as the start of the movement of the electronic apparatus 10, thus the stopping-movement specifying unit 410 is deemed to be able to specify the start of the movement of the electronic apparatus 10.

The stopping-movement specifying unit 410 can specify, in the stopping-movement specification, a travel means of the user 9 when the stopping-movement specifying unit 410 determines that the user 9 is traveling. For example, the stopping-movement specifying unit 410 can specify whether the user 9 is traveling by himself/herself without riding a conveying device or traveling in the conveying device, based on the acceleration detected by the accelerometer 200. Herein, the term "the user 9 travels by himself/herself" means that the user 9 travels on foot without riding the conveying device. When the action of the user 9 traveling by himself/herself is referred to as "self traveling", the stopping-movement specifying unit 410 is deemed to be able to specify the self traveling of the user 9. When the action of the user 9 traveling in the conveying device is referred to as "conveying-device traveling", the stopping-movement specifying unit 410 can specify the conveying-device traveling of the user 9.

The self traveling which the stopping-movement specifying unit 410 can specify includes the movement of the user 9 by walking and the movement of the user 9 by running. When the action of the user 9 traveling by running is referred to as "running", the self traveling includes the walking and the running. The conveying-device traveling which the stopping-movement specifying unit 410 can specify includes the movement of the user 9 by bicycle and the movement of the user 9 by a conveying device, such as an automobile, a train, and a bus, which enables a traveling faster than the bicycle.

Hereinafter, the simple term "the conveying device" means a conveying device which enables the traveling faster than the bicycle, in order to distinguish the bicycle from a conveying device which enables the traveling faster than the bicycle. The term "self" is used as a name of a travel means in the case where the user 9 performs the self traveling, the term "walking" is used as a name of a travel means in the case where the user 9 travels by walking, and the term "running" is used as a name of a travel means in the case where the user 9 travels by running.

Known is that the acceleration of the electronic apparatus 10 shows a specific pattern of time change corresponding to the travel means of the user 9 having the electronic apparatus 10. The stopping-movement specifying unit 410 specifies that the travel means of the user 9 is "walking" when the pattern of the time change of the acceleration detected by the accelerometer 200 shows the pattern corresponding to "walking". The stopping-movement specifying unit 410 specifies that the travel means of the user 9 is "running" when the pattern of the time change of the acceleration detected by the accelerometer 200 shows the pattern corresponding to "running". The stopping-movement specifying unit 410 specifies that the travel means of the user 9 is "bicycle" when the pattern of the time change of the acceleration detected by the accelerometer 200 shows the pattern corresponding to "bicycle". The stopping-movement specifying unit 410 specifies that the travel means of the user 9 is "conveying device" when the pattern of the time change of the acceleration detected by the accelerometer 200 shows the pattern corresponding to "conveying device".

In the manner described above, the stopping-movement specifying unit 410 can specify which is the travel means of the user 9, the walking, the running, the bicycle, or the conveying device. The controller 100 can display the travel means specified by the stopping-movement specifying unit 410 and a moving distance of the user 9 (in other words, a moving distance of the electronic apparatus 10), for example, on the display 120. Accordingly, the user 9 can confirm a walking distance, a running distance, a moving distance by bicycle, and a moving distance by the conveying device distinctively from each other. The controller 100 can obtain the moving distance of the user 9 based on the positional information obtained by the receiver 140, for example.

The indoor specifying unit 420 can specify that the user 9 is in a facility such as a house, a building, and a shop. That is to say, the indoor specifying unit 420 can perform an indoor specification for specifying that the user 9 is located indoors. A state where the user 9 is located indoors is simply referred to as "indoor" and a state where the user 9 is not located indoors is simply referred to as "outdoor" in some cases. Details of the indoor specification are described hereinafter.

The position determiner 430 can determine whether or not the user 9 is located in a predetermined region (in other words, a predetermined position). In other words, the position determiner 430 can determine whether or not the electronic apparatus 10 is located in a predetermined region (in other words, a predetermined position). Adopted as the predetermined region are, for example, an area where an accident is likely to occur between the pedestrian and the vehicle 6 and a region including a neighborhood of the area. The predetermined region includes, for example, an intersection region including the intersection 2 and a neighborhood thereof, a T-shaped intersection region including a T-shaped intersection and a neighborhood thereof, and a school route region including a school route of children and a neighborhood thereof. The position determiner 430 can separately determine whether or not the user 9 is located in the intersection region, whether or not the user 9 is located in the T-shaped intersection region, and whether or not the user 9 is located in the school route region.

The position determiner 430 can determine whether or not the user 9 is located in the predetermined region based on the positional information obtained by the receiver 140 and map information stored in the storage 103, for example. The position determiner 430 may determine whether or not the user 9 is located in the predetermined region based on whether or not the wireless communication unit 110 can receive the signal from the roadside unit 5 disposed in the intersection 2, for example.

As described above, the state specifying unit 400 can specify various states of the user 9. The types of the states of the user 9 specified by the state specifying unit 400 are not limited to those described above.

The step number measurement unit 300 can measure the number of steps of the user 9 who performs the self traveling. The step number measurement unit 300 measures the number of steps of the user 9 who performs the self traveling based on the acceleration detected by the accelerometer 200, for example. The step number measurement unit 300 measures the number of steps of the user 9 when the stopping-movement specifying unit 410 specifies that the user 9 is walking or running. The controller 100 can display the number of steps measured by the step number measurement unit 300 on the display 120.

The notification determiner 500 can perform determination processing for determining whether or not the electronic apparatus 10 transmits a notification outside the electronic apparatus 10 based on the state of the user 9 specified by the state specifying unit 400, for example.

For example, when the position determiner 430 determines that the user 9 is located in the intersection region and also when the stopping-movement specifying unit 410 specifies that the travel means of the user 9 is "running", the notification determiner 500 determines that the electronic apparatus 10 transmits the notification outside the electronic apparatus 10. When the position determiner 430 determines that the user 9 is located in the intersection region and also when the stopping-movement specifying unit 410 specifies that the travel means of the user 9 is "bicycle", the notification determiner 500 determines that the electronic apparatus 10 transmits the notification outside the electronic apparatus 10. When the notification determiner 500 determines that the electronic apparatus 10 transmits the notification outside the electronic apparatus 10, the wireless communication unit 110 transmits presence notification information for notifying the vehicle 6 located in the intersection region of the presence of the user 9 (the pedestrian) near the vehicle 6 to the roadside unit 5. The presence notification information may include information indicating the travel means of the user 9 specified by the stopping-movement specifying unit 410. The roadside unit 5 transmits the received presence notification information to the vehicle 6 located in the intersection region. At this time, the roadside unit 5 transmits the presence notification information in a broadcast form, for example. The vehicle 6 notifies a driver, for example, of a caution based on the received presence notification information. The vehicle 6 notifies the driver that the pedestrian is located near the vehicle 6 using a car navigation device, for example. Accordingly, the driver of the vehicle 6 located in the intersection region can drive the vehicle 6 while recognizing a person in the intersection region. As a result, safety in driving the vehicle 6 is increased. The state where the electronic apparatus 10 transmits the notification outside the electronic apparatus 10 is referred to as "notification execution" in some cases hereinafter. The state where the electronic apparatus 10 does not transmit the notification outside the electronic apparatus 10 is referred to as "notification non-execution" in some cases.

Contents of the information which the electronic apparatus 10 transmits outside the electronic apparatus 10 are not limited to the examples descried above. The electronic apparatus 10 can also directly transmit the notification to the vehicle 6.

One Example of Indoor Specification

Details of the indoor specification in the present example are described hereinafter. Identification information called basic service set identifier (BSSID) is allocated to an access point which is a type of a communication device performing a wireless communication using a wireless LAN. The BSSID is information specific to each access point. A user of the access point cannot change contents of the BSSID allocated to the access point. For example, a MAC address is adopted to the BSSID. Information other than the MAC address may be adopted to the BSSID. The access point can wirelessly transmit the BSSID allocated thereto at regular intervals in a broadcast form, for example.

The access point is disposed indoors in many cases, thus when the wireless communication unit 110 receives the BSSID, the user 9 can be determined to be located indoors.

However, there is also a possibility that the access point is disposed outdoors, thus if the user 9 is immediately determined to be located indoors in the case where the wireless communication unit 110 receives the BSSID, there is a possibility that the user 9 is erroneously determined to be located indoors even when the user 9 is located outdoors.

Thus, in the present example, the storage 103 stores positional information indicating the position of the electronic apparatus 10 at a time when the wireless communication unit 110 receives the BSSID transmitted from the access point, as registered positional information. In the case where the wireless communication unit 110 receives the BSSID, when the position of the electronic apparatus 10 at that time is located within a predetermined range from the position indicated by the registered positional information, the user 9 is determined to be located indoors. In the case where the registered positional information indicates the position of the electronic apparatus 10 at the time when the wireless communication unit 110 receives the BSSID transmitted from the access point which is located indoors, there is a high possibility that the user 9 is located indoors when the position of the electronic apparatus 10 at the time of receiving the BSSID is close to the position indicated by the registered positional information. Accordingly, the user 9 is determined to be located indoors when the position of the electronic apparatus 10 at the time of receiving the BSSID is located within the predetermined range from the position indicated by the registered positional information, thus it can be specified more correctly that the user 9 is located indoors.

Figure 6:
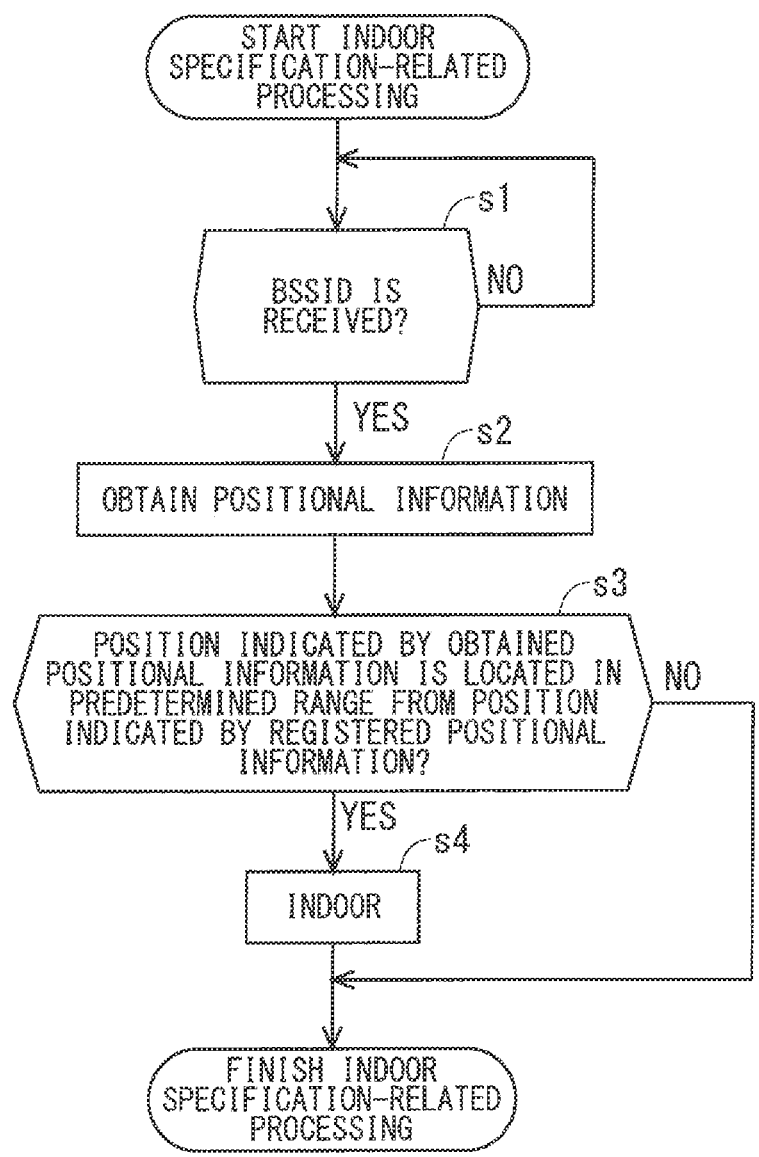
FIG. 6 illustrates a flow chart showing one example of an operation of the electronic apparatus.

FIG. 6 is a flow chart showing one example of an operation of the electronic apparatus 10 executing processing regarding the indoor specification ("indoor specification-related processing" hereinafter). The electronic apparatus 10 executes the indoor specification-related processing illustrated in FIG. 6 repeatedly at regular or irregular intervals.

As illustrated in FIG. 6, in Step s1, the controller 100 determines whether or not the wireless communication unit 110 receives the BSSID. In other words, the controller 100 determines whether or not the controller can obtain the BBSID from the received signal in the wireless communication unit 110. Step s1 is executed until it is determined that the wireless communication unit 110 receives the BSSID.

When it is determined that the wireless communication unit 110 receives the BSSID in Step s1, the controller 100 obtains latest positional information from the receiver 140 in Step s2. This positional information is deemed to be positional information indicating the position of the electronic apparatus 10 at the time when the BSSID received in Step s1 is received. The positional information obtained in Step s2 is referred to as "the obtained positional information" in some cases hereinafter.

After Step s2, the position determiner 430 determines whether or not the position indicated by the obtained positional information is located within the predetermined range from the position indicated by the registered positional information in the storage 103 in Step s3. In other words, the position determiner 430 determines whether or not the position indicated by the obtained positional information is close to the position indicated by the registered positional information in the storage 103. The predetermined range in Step s3 is set to approximately several m to 10 m, for example.

When it is determined in Step s3 that the position indicated by the obtained positional information is not located within the predetermined range from the position indicated by the registered positional information, the indoor specification-related processing is finished. In the meanwhile, when it is determined that the position indicated by the obtained positional information is located within the predetermined range from the position indicated by the registered positional information, the indoor specifying unit 420 determines in Step s4 that the user 9 is located indoors. After Step s4, the indoor specification-related processing is finished.

A plurality of registered positional information may be registered in the storage 103. In this case, the position determiner 430 determines in Step s3 whether or not the position indicated by the obtained positional information is located within the predetermined range from the position indicated by the registered positional information for each of the plurality of registered positional information. Then, when the plurality of registered positional information includes the registered positional information in which the position indicated by the obtained positional information is located in the predetermined range from the position indicated by the registered positional information, Step s4 is executed and the location of the user 9 is determined to be "indoor".

As describe above, in the present example, the location of the user 9 is not immediately determined to be "indoor" when the wireless communication unit 110 receives the BSSID, but is determined to be "indoor" when the electronic apparatus 10 is located within the predetermined range from the position indicated by the registered positional information, at the time of receiving the BSSID, in the case where the wireless communication unit 110 receives the BSSID. Accordingly, it can be specified that the user 9 is located indoors more correctly.

Figure 7:
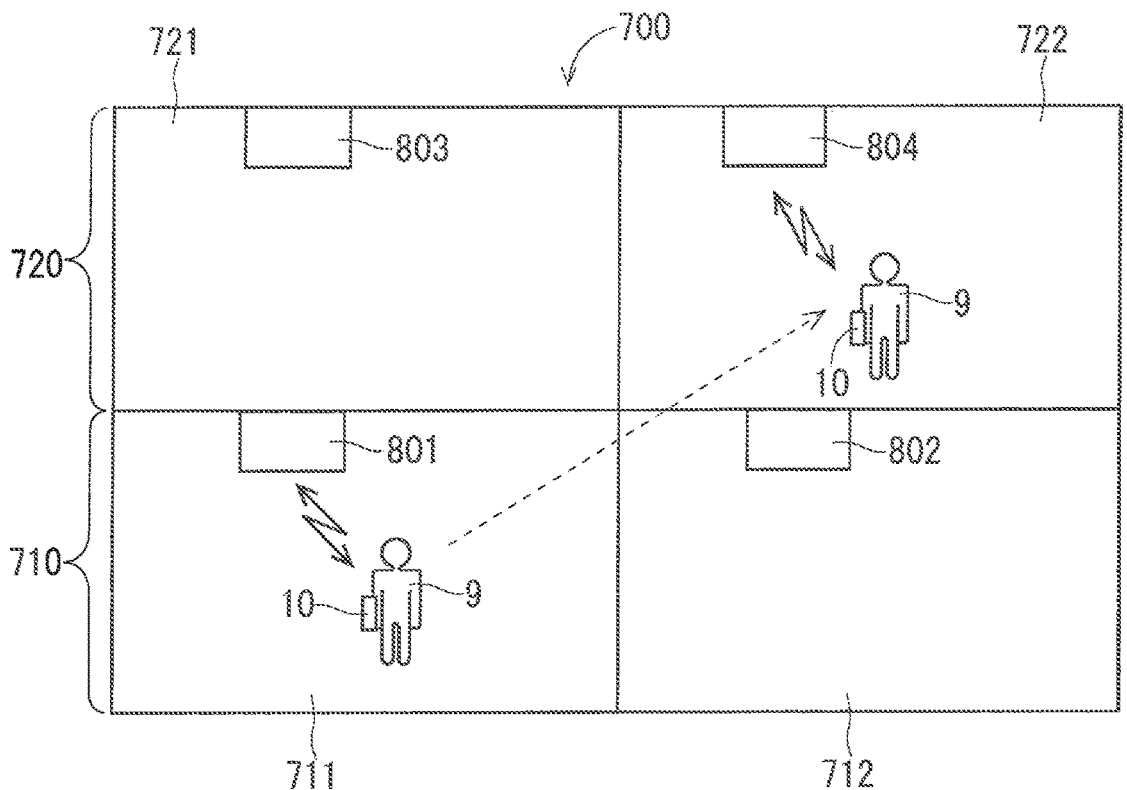
FIG. 7 illustrates a drawing showing one example of a user of the electronic apparatus located indoors.

FIG. 7 is a drawing showing one example of the user 9 with the electronic apparatus 10 located in a building 700 in which a plurality of access points are provided. In the example in FIG. 7, a first floor area 710 of the building 700 includes two rooms 711 and 712, and a second floor area 720 of the building 700 includes two rooms 721 and 722. A plurality of access points 801 to 804 are provided in the plurality of rooms 711, 712, 721, and 722, respectively. A specific BSSID is allocated to each of the plurality of access points 801 to 804. The positional information indicating the position of the electronic apparatus 10 at the time when the wireless communication unit 110 receives the BSSID allocated to the access point 803 is registered in the storage 103 of the electronic apparatus 10, for example, as the registered positional information. This registered positional information is deemed to indicate the position of the electronic apparatus 10 located in the room 721 in the second floor area 720, in other words, the position of the user 9 located in the room 721.

As illustrated in FIG. 7, for example, when the user 9 is located in the room 711 in the first floor area 710, the position of the electronic apparatus 10 at the time when the wireless communication unit 110 receives the BSSID from the access point 801 is close to the position indicated by the registered positional information. Accordingly, when the user 9 is located in the room 711 in the first floor area 710, the indoor specifying unit 420 can determine that the user 9 is located indoors.

Even when the user 9 moves from the room 711 in the first floor area 710 to the room 722 in the second floor area 720, the position of the electronic apparatus 10 at the time when the wireless communication unit 110 receives the BSSID from the access point 804 is close to the position indicated by the registered positional information. Accordingly, even when the user 9 is located in the room 722 in the second floor area 720, the indoor specifying unit 420 can determine that the user 9 is located indoors. In the example in FIG. 7, even in the case where the user 9 is located in any of the rooms 711, 712, 721, and 722, the indoor specifying unit 420 can specify that the user 9 is located indoors.

One Example of Registration Method of Registered Positional Information

Next, an example of a registration method of the registered positional information is described. The operation mode of the electronic apparatus 10 includes a registration mode of registering the registered positional information. When the user 9 performs a predetermined operation on the display region 12, for example, the operation mode of the electronic apparatus 10 is changed to the registration mode.

Figure 8:
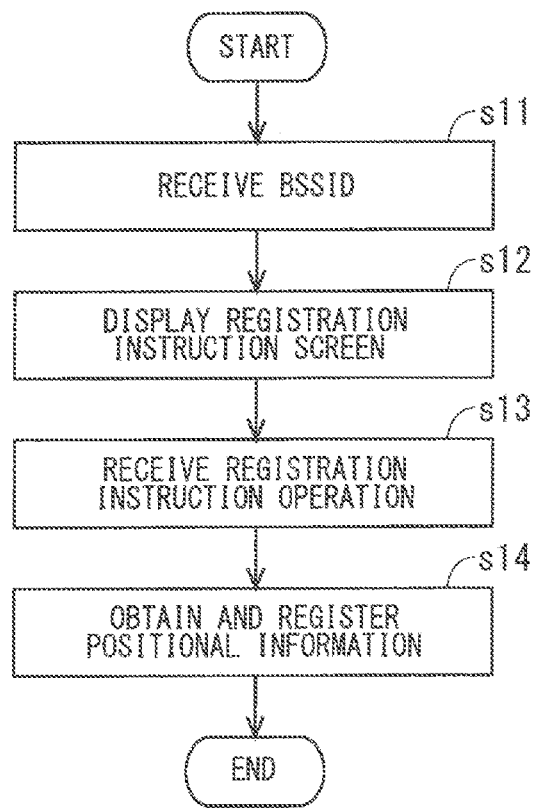
FIG. 8 illustrates a flow chart showing one example of an operation of the electronic apparatus.

FIG. 8 is a flow chart showing one example of the operation of the electronic apparatus 10 in a registration mode. In a state where the operation mode of the electronic apparatus 10 enters the registration mode, as illustrated in FIG. 8, when the wireless communication unit 110 receives the BSSID in Step s11, the controller 100 causes the display 120 to display a registration instruction screen 600 for receiving a registration instruction operation performed by the user 9 in Step s12. The registration instruction operation is an operation for instructing to register the positional information, which indicates the position of the electronic apparatus 10 at the time when the wireless communication unit 110 receives the BSSID from the access point, as the registered positional information in the electronic apparatus 10.

Figure 9:
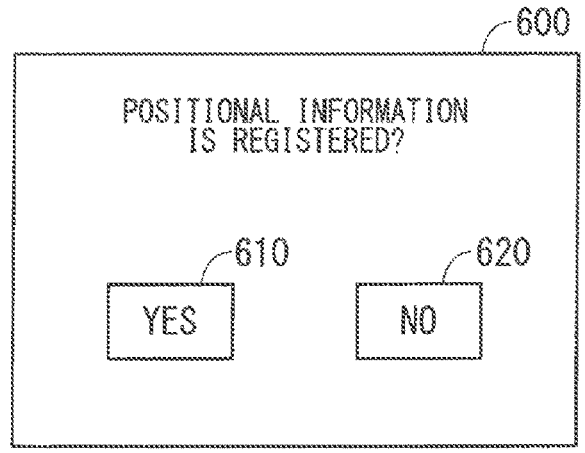
FIG. 9 illustrates a flow chart showing one example of an operation of the electronic apparatus.

FIG. 9 is a drawing showing one example of the registration instruction screen 600. The registration instruction screen 600 includes a first operation button 610 and a second operation button 620, for example. In the present example, a tap operation performed on the first operation button 610 is the registration instruction operation, for example. After Step s12, when the touch panel 130 receives the tap operation performed on the first operation button 610 in Step s13, that is to say, when the operation unit 210 receives the registration instruction operation, the controller 100 obtains the latest positional information from the receiver 140 and stores the obtained positional information as the registered positional information in the storage 103 in Step s14. When Step s14 is executed, the registration mode is cancelled. When the tap operation, for example, is performed on the second operation button 610 included in the registration instruction screen 600, the registration mode is cancelled.

The user 9 located indoors performs a predetermined operation on the display region 12 to cause the electronic apparatus 10 to change the operation mode to the registration mode. Then, the user 9 located indoors performs the tap operation on the first operation button 610 in the registration instruction screen 600 displayed on the display 120, thereby causing the electronic apparatus 10 to store the latest positional information obtained by the receiver 140 in the storage 103. Accordingly, there is a high possibility that the positional information indicating the position of the electronic apparatus 10 at the time when the wireless communication unit 110 receives the BSSID transmitted from the access point located indoors is registered in the electronic apparatus 10 as the registered positional information.

For example, in the case where the user 9 is located in the room 721 illustrated in FIG. 7 described above, when the operation mode of the electronic apparatus 10 is changed to the registration mode, the electronic apparatus 10 receives the BSSID from the access point 803 and displays the registration instruction screen 600. When the user 9 performs the tap operation on the first operation button 610 included in the registration instruction screen 600, the latest positional information obtained by the receiver 140 is registered in the electronic apparatus 10. Accordingly, even when the user 9 is located in any of the rooms 711, 712, 721, and 722, the electronic apparatus 10 can correctly specify that the user 9 is located indoors.

Figure 10:
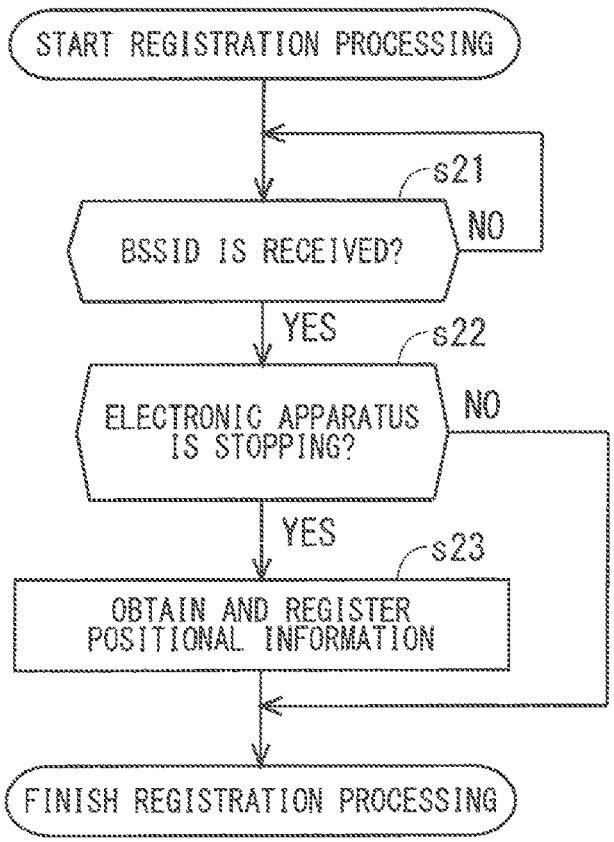
FIG. 10 illustrates flow chart showing one example of an operation of the electronic apparatus.

In the example described above, the positional information is registered in the electronic apparatus 10 by the user operation performed on the electronic apparatus 10, however, the positional information may be automatically registered in the electronic apparatus 10. FIG. 10 is a flow chart illustrating one example of the operation of the electronic apparatus 10 in this case. The electronic apparatus 10 executes the registration processing illustrated in FIG. 10 repeatedly at regular or irregular intervals.

As illustrated in FIG. 10, in Step s21, the controller 100 determines whether or not the wireless communication unit 110 receives the BSSID. Step s21 is executed until it is determined that the wireless communication unit 110 receives the BSSID.

When it is determined that the wireless communication unit 110 receives the BSSID in Step s21, the stopping-movement specifying unit 410 of the controller 100 determines whether or not the electronic apparatus 10 is stopping in Step s22. When it is determined that the electronic apparatus 10 does not stop in Step s22, the registration processing is finished. In the meanwhile, when it is determined that the electronic apparatus 10 is stopping in Step s22, the controller 100 obtains the latest positional information from the receiver 140 and stores the obtained positional information as the registered positional information in the storage 103 in Step s23. Registered accordingly in the storage 103 is the positional information indicating the position of the electronic apparatus 10 at the time when the wireless communication unit 110 receives the BSSID in the case where the electronic apparatus 10 is stopping. For example, when the electronic apparatus 10 is placed on a desk in the room 722 illustrated in FIG. 7, the positional information indicating the position of the electronic apparatus 10 at the time of receiving the BSSID transmitted from the access point 804 in the room 722 is registered in the storage 103 in Step s23. However, when the positional information which is the same as the positional information obtained in Step s23 is already registered, the positional information obtained in Step 23 is not registered.

Herein, when the electronic apparatus 10 is stopping, there is a high possibility that the electronic apparatus 10 is located indoors. Accordingly, when the wireless communication unit 110 receives the BSSID from the access point in the case where the electronic apparatus 10 is stopping, there is a high possibility that the access point is located indoors. Accordingly, as is the case with the example in FIG. 10, the positional information indicating the position of the electronic apparatus 10 at the time when the wireless communication unit 110 receives the BSSID in the case where the electronic apparatus 10 is stopping is set to the registered positional information, thus there is a high possibility that the positional information indicating the position of the electronic apparatus 10 at the time when the wireless communication unit 110 receives the BSSID transmitted from the access point located indoors is registered in the electronic apparatus as the registered positional information.

Figure 11:
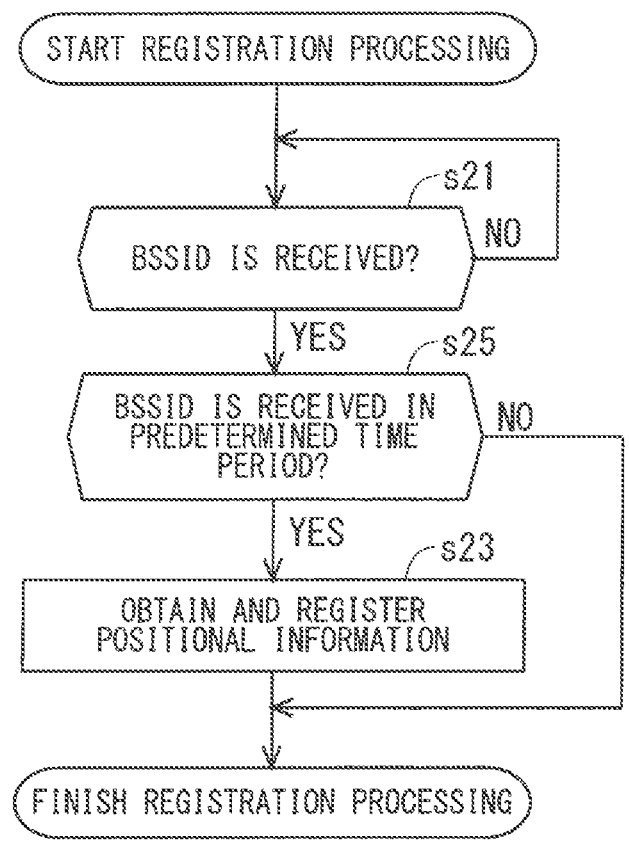
FIG. 11 illustrates a flow chart showing one example of an operation of the electronic apparatus.

In the registration processing, as illustrated in FIG. 11, Step s25 may be executed instead of Step s22. In Step s25, the controller 100 determines whether or not the wireless communication unit 110 receives the BSSID in a predetermined time period. In other words, the controller 100 determines whether or not a receipt time of the BSSID is included in the the predetermined time period in Step s21. Considered as the predetermined time period is a time period when the user 9 has a high possibility of being located indoors (a time period when the electronic apparatus 10 has a high possibility of being located indoors), for example, time period of midnight. A time period from eleven p.m. to two a.m., for example, is considered as the time period of midnight. When the controller 100 estimates the time period when the user 9 has the high possibility of being located indoors based on the positional information obtained by the receiver 140, for example, it may be determined whether or not the BSSID is received in the estimated time period. In Step s25, when the controller 100 determines that the wireless communication unit 110 receives the BSSID in the predetermined time period, the controller 100 executes Step s23 to register the latest positional information obtained from the receiver 140 in the storage 103. Also in the example in FIG. 1, there is a high possibility that the positional information indicating the position of the electronic apparatus 10 at the time of receiving the BSSID transmitted from the access point located indoors is registered in the electronic apparatus 10 as the registered positional information.

Figure 12:
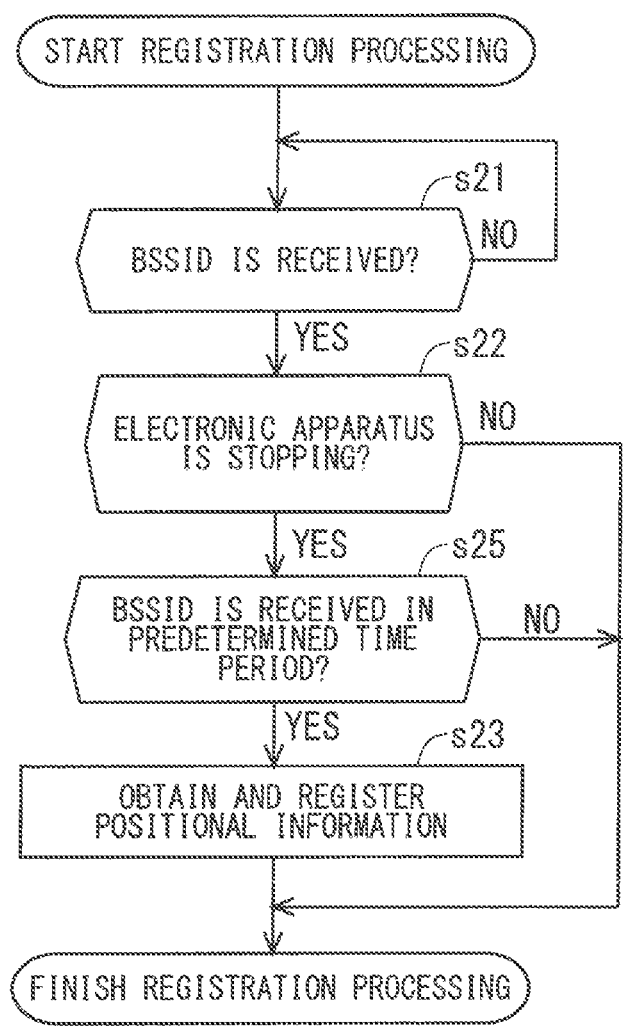
FIG. 12 illustrates a flow chart showing one example of an operation of the electronic apparatus.

As illustrated in FIG. 12, in the registration processing, Step s25 may be executed instead of Step s22. In the example in FIG. 11, when it is determined in Step s22 that the electronic apparatus 10 is stopping, Step s25 is executed. When it is determined in Step s25 that the wireless communication unit 110 receives the BSSID in the predetermined time period, the latest positional information obtained from the receiver 140 is registered in the storage 103 in Step s23. Accordingly, there is a higher possibility that the positional information indicating the position of the electronic apparatus 10 at the time of receiving the BSSID transmitted from the access point located indoors is registered in the electronic apparatus 10 as the registered positional information. Accordingly, it can be specified that the user 9 is located indoors more correctly. The order of executing Step s22 and Step s25 may be switched.

As illustrated in FIGS. 10 to 12, the positional information is automatically registered in the electronic apparatus 10, thus convenience of the electronic apparatus 10 is increased.

Figure 13:
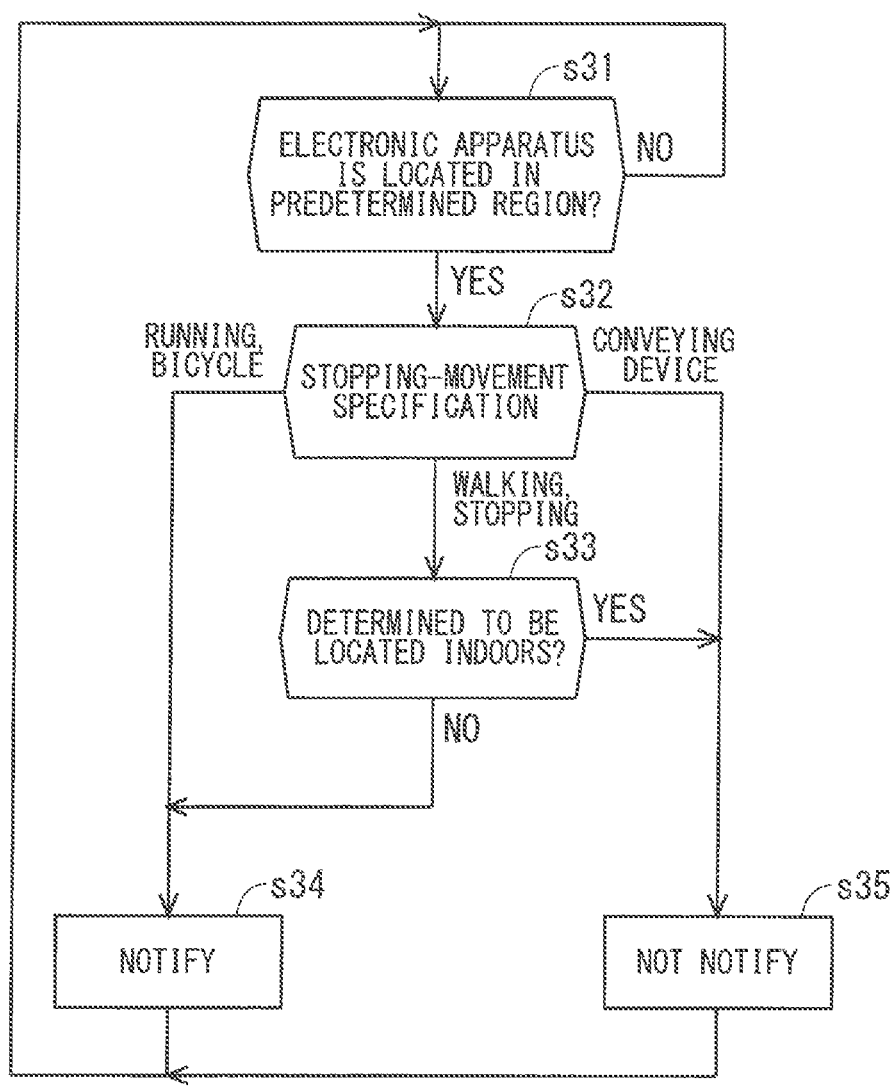
FIG. 13 illustrates a flow chart showing one example of an operation of the electronic apparatus.

Example of Series of Operations of Electronic Apparatus Until Notification is Transmitted Outside FIG. 13 is a flow chart showing one example of an operation of the electronic apparatus 10 until the electronic apparatus 10 transmits the notification outside. The electronic apparatus 10 executes the series of processing illustrated in FIG. 13 repeatedly at regular or irregular intervals.

As illustrated in FIG. 13, in Step s31, the position determiner 430 determines whether or not the electronic apparatus 10 is located in the predetermined region. When it is determined in Step s31 that the electronic apparatus 10 is located in the predetermined region, the stopping-movement specifying unit 410 performs the stopping-movement specification in Step s32. When it is not determined in Step s31 that the electronic apparatus 10 is located in the predetermined region, Step s31 is executed again.

When it is specified that the user 9 is traveling and the travel means of the user 9 is "conveying device" in the stopping-movement specification in Step s32, the notification determiner 500 determines the notification non-execution in Step s35. When the travel means of the user 9 is the conveying device such as the automobile, the train, and the bus, the user 9 has a high possibility of being safe from the vehicle 6, thus it is deemed that there is a less need for providing a driver of the vehicle 6 with the caution. Thus, when it is specified that the travel means of the user 9 is "conveying device", the notification determiner 500 determines that the electronic apparatus 10 does not transmit the notification outside. Accordingly, when the user 9 is safe from the vehicle 6, a possibility that the driver of the vehicle 6 receives information which is not so much necessary can be reduced. Thus, a possibility that the driver of the vehicle 6 feels bothersome due to the receipt of the information which is not so much necessary can be reduced. When Step s35 is executed, the electronic apparatus 10 executes Step s31 again, and subsequently operates in the similar manner.

When it is specified that the user 9 is traveling and the travel means of the user 9 is "running" in the stopping-movement specification in Step s32, Step 34 is executed.

When it is specified that the user 9 is traveling and the travel means of the user 9 is "bicycle" in the stopping-movement specification, Step 34 is executed. In Step s34, the notification determiner 500 determines the notification execution. When the travel means of the user 9 is "running" and "bicycle", the user 9 is far from being safe from the vehicle 6. Thus, when it is specified that the travel means of the user 9 is "running" or "bicycle", the notification determiner 500 determines that the electronic apparatus 10 transmits the notification outside. When Step s34 is executed, the electronic apparatus 10 executes Step s31 again, and subsequently operates in the similar manner.

When the notification determiner 500 determines the notification execution, the wireless communication unit 110 notifies the roadside unit 5 of presence notification information described above, for example. The roadside unit 5 notifies the vehicle 6 located in the predetermined region of the received presence notification information. When it is determined that the electronic apparatus 10 is located in the T-shaped intersection region, for example, in Step s31, the roadside unit 5 provided in the T-shaped intersection region notifies the vehicle 6 located in the T-shaped intersection region of the presence notification information received from the electronic apparatus 10. The vehicle 6 notifies a driver of a caution based on the received presence notification information. The electronic apparatus 10 may directly notify the vehicle 6 located in the T-shaped intersection region of the presence notification information.

When it is specified that the user 9 is stopping in the stopping-movement specification in Step s32, the controller 100 determines in Step s33 whether or not the location of the user 9 is determined to be "indoor" in the immediately previous indoor specification in the indoor specifying unit 420. When it is specified that the user 9 is traveling and the travel means of the user 9 is "walking" in the stopping-movement specification, the controller 100 determines in Step s33 whether or not the location of the user 9 is determined to be "indoor" in the immediately previous indoor specification in the indoor specifying unit 420.

When the location of the user 9 is determined to be "indoor" in the immediately previous indoor determination in Step s33, Step s35 is executed and the notification non-execution is determined. When the user 9 is located in the facility such as the building, the user 9 has a high possibility of being safe from the vehicle 6. Accordingly, when the location of the user 9 is determined to be "indoor" in the immediately previous indoor specification, it is determined that the electronic apparatus 10 does not transmit the notification outside.

In the meanwhile, when it is confirmed that the location of the user 9 is not determined to be "indoor" in the immediately previous indoor specification in Step s33, Step s34 is executed and the notification execution is determined. When it is unknown whether or not the user 9 is located indoors, the user 9 is far from being safe from the vehicle 6. Accordingly, when the location of the user 9 is not determined to be "indoor" in the immediately previous indoor specification, it is determined that the electronic apparatus 10 transmits the notification outside.

The notification determiner 500 may determine the notification execution instead of Step s35. In this case, for example, the electronic apparatus 10 may transmit, via the roadside unit 5 or directly to the vehicle 6, notification information for notifying that the user 9 located near the vehicle 6 has a small risk of running out into a roadway.

Figure 14:
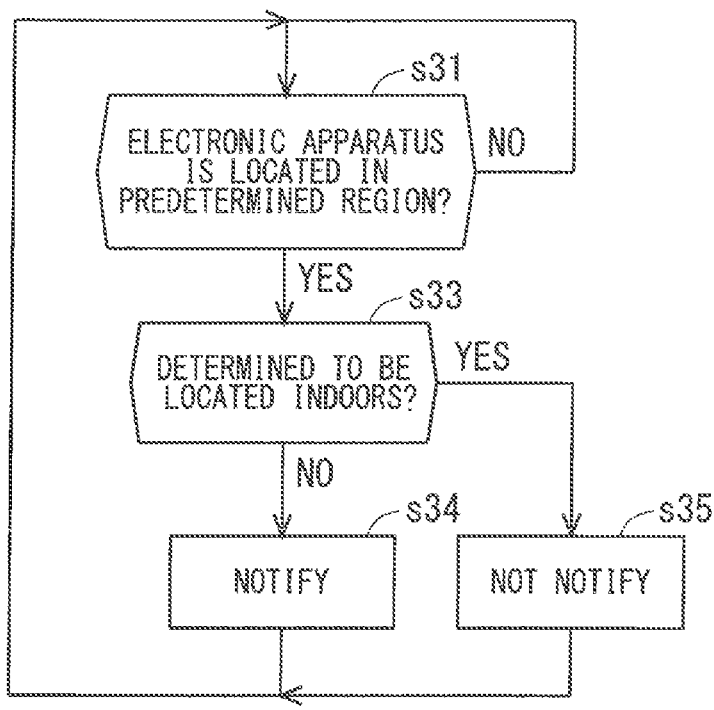
FIG. 14 illustrates a flow chart showing one example of an operation of the electronic apparatus.

As illustrated in FIG. 14, the stopping-movement specification of Step s32 may not be executed. In this case, when it is determined that the electronic apparatus 10 is located in the predetermined region in Step s31, Step s33 is executed.

Figure 15:
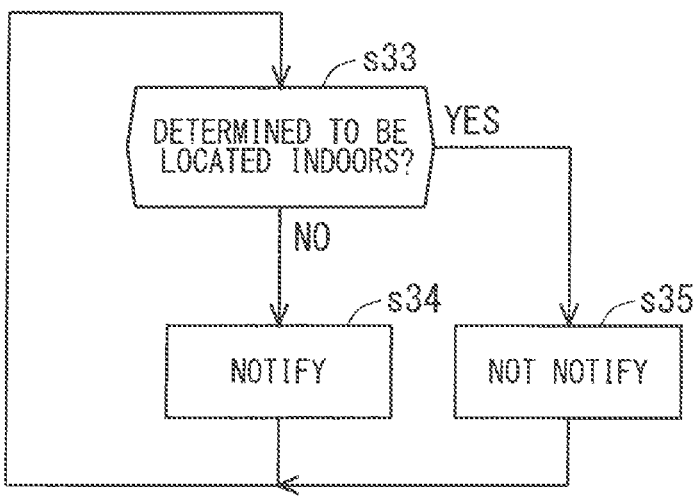
FIG. 15 illustrates a flow chart showing one example of an operation of the electronic apparatus.

As illustrated in FIG. 15, Step s31 may not be executed. In the example in FIG. 15, Step s31 is not executed in the flow in FIG. 14, however, Step s31 may not be executed in the flow in FIG. 13. In this case, when Step s34 is executed, Step s32 is executed again, and when Step s35 is executed, Step s32 is executed again.

Figure 16:
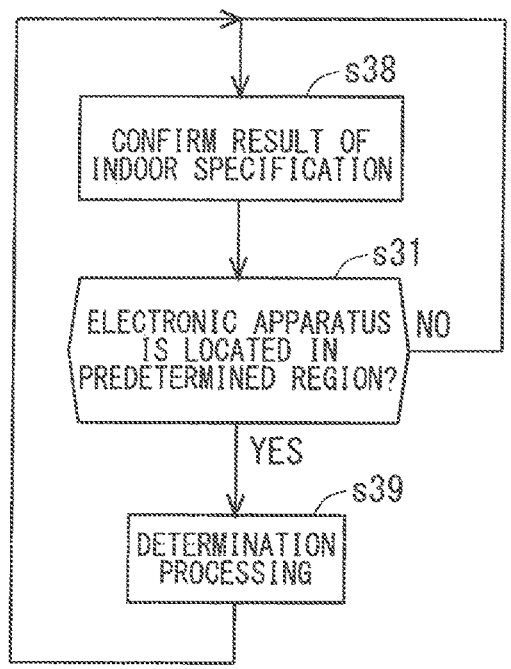
FIG. 16 illustrates a flow chart showing one example of an operation of the electronic apparatus.

As illustrated in FIG. 16, Step s31 may be executed after Step s38. In Step s38, the controller 100 confirms the result of the immediately previous indoor specification. When it is determined in Step s31 that the electronic apparatus 10 is located in the predetermined region, the notification determiner 500 performs, in Step s39, the determination processing for determining whether or not the electronic apparatus 10 transmits the notification outside based on the result confirmed in Step s38. When the location of the user 9 is determined to be "indoor" in the immediately previous indoor specification, the notification determiner 500 determines the notification non-execution in Step s39. When the location of the user 9 is not determined to be "indoor" in the immediately previous indoor specification, the notification determiner 500 determines the notification execution.

Although the stopping-movement specification is not performed in the example in FIG. 16, the stopping-movement specification may be performed before Step s31. In this case, in Step s39, the notification determiner 500 determines whether or not the electronic apparatus 10 transmits the notification outside based on the result of the stopping-movement specification and the result of the confirmation in Step s38. For example, when it is specified that the travel means is "conveying device" in the stopping-movement specification, the notification determiner 500 determines the notification non-execution. When the location of the user 9 is determined to be "indoor" in the immediately previous indoor specification, the notification determiner 500 determines the notification non-execution. When it is specified that the travel means is "running" in the stopping-movement specification, the notification determiner 500 determines the notification execution. When it is specified that the travel means is "bicycle" in the stopping-movement specification, the notification determiner 500 determines the notification execution. When it is specified that the travel means is "walking" in the stopping-movement specification and the location of the user 9 is not determined to be "indoor" in the immediately previous indoor specification, the notification determiner 500 determines the notification execution. Then, when it is specified that the user 9 is stopping in the stopping-movement specification and the location of the user 9 is not determined to be "indoor" in the immediately previous indoor specification, the notification determiner 500 determines the notification execution.

As described above, the notification determiner 500 determines whether or not the electronic apparatus 10 transmits the notification outside based on the result of the indoor specification, thus a possibility that the electronic apparatus 10 transmits the notification, which is not so much necessary, outside can be reduced. Thus, convenience of the electronic apparatus 10 is increased.

In the examples in FIGS. 13, 14, and 16, for example, the notification determiner 500 performs the determination processing when the electronic apparatus 10 is located in the predetermined region, and does not perform the determination processing when the electronic apparatus 10 is not located in the predetermined region, thus the electronic apparatus 10 can determine whether or not the electronic apparatus 10 transmits the notification outside when necessary.

Another Example

Figure 17:
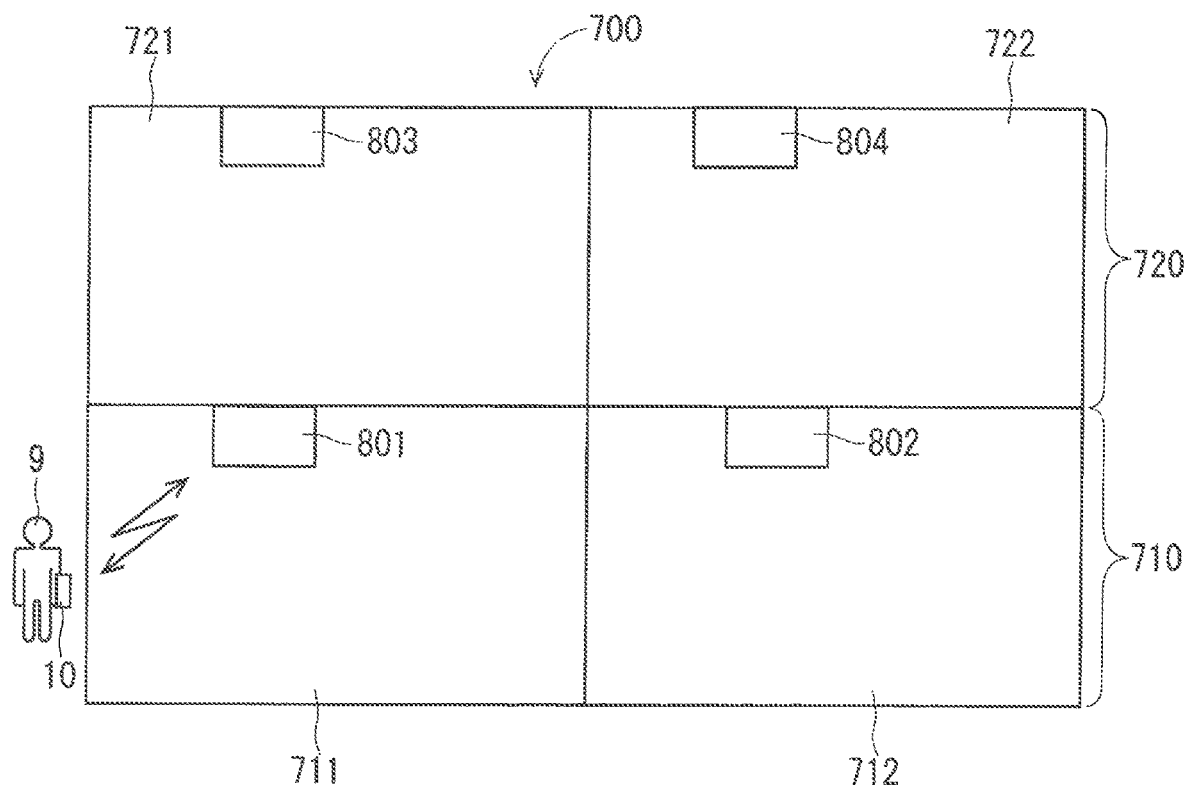
FIG. 17 illustrates a drawing showing one example of a user of the electronic apparatus located outdoors.

Even outside the building 700 illustrated in FIG. 7 described above, when the user 9 is located near the building 700, the electronic apparatus 10 may be able to receive the BSSID from the access point in the building 700. Accordingly, there is a possibility that the location of the user 9 is determined to be "indoor" even when the user 9 is not located indoors in the indoor specification. FIG. 17 shows a state where the electronic apparatus 10 held by the user 9 located near the building 700 can receive the BSSID from the access point 801 in the building 700. In the example in FIG. 17, the position of the electronic apparatus 10 at the time of receiving the BSSID from the access point 801 is located within the predetermined range from the position indicated by the registered positional information, thus the user 9 is erroneously determined to be located indoors in the indoor specification.

In the meanwhile, when the user 9 is located in the building 700, there is a high possibility that reception strength of the electronic apparatus 10 receiving the BSSID is higher than the case where the user 9 is located outside the building 700.

Figure 18:
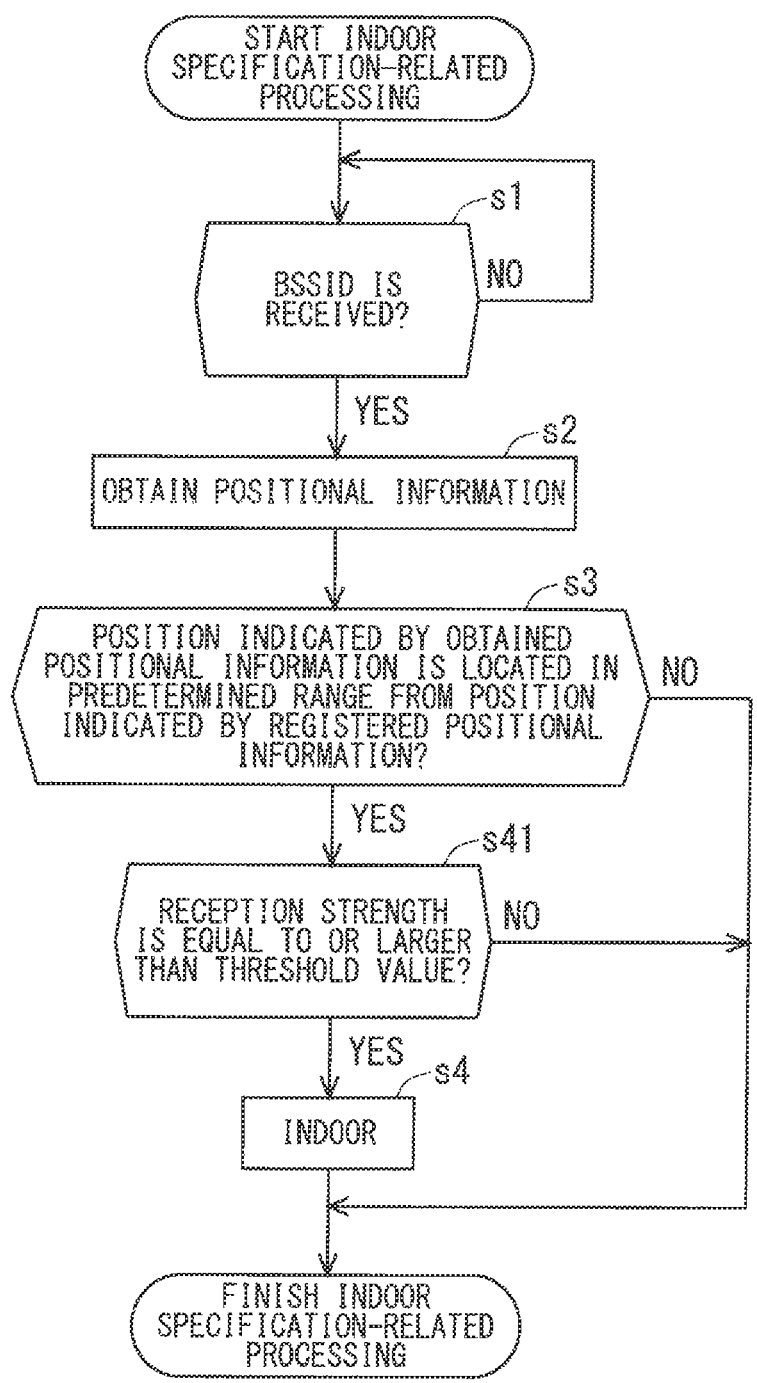
FIG. 18 illustrates a flow chart showing one example of an operation of the electronic apparatus.

Thus, in the present example, the indoor specifying unit 420 performs the indoor specification based on not only the positional information but also the reception strength of the BSSID. FIG. 18 is a flow chart showing one example of the indoor specification-related processing according to the present modification example.

As illustrated in FIG. 18, the controller 100 executes Steps s1 to s3 described above. When it is determined in Step s3 that the position indicated by the positional information obtained in Step s2 is located within the predetermined range from the position indicated by the registered positional information, the indoor specifying unit 420 determines in Step s41 whether or not the reception strength of the BSSID received in Step s1 is equal to or larger than a threshold value.

Herein, the wireless communication unit 110 can obtain the reception strength of the signal receive by the wireless communication unit 110. Examples of the reception strength obtained by the wireless communication unit 110 include a received signal strength indicator (RSSI). The indoor specifying unit 420 determines whether or not the reception strength of the received signal with the BSSID obtained by the wireless communication unit 110, that is to say, the reception strength of the BSSID is equal to or larger than the threshold value.

In Step s41, when the reception strength of the BSSID is smaller than the threshold value, in other words, when the reception strength of the BSSID is determined to be small, the indoor specification-related processing is finished. In the meanwhile, when it is determined that the reception strength of the BSSID is equal to or larger than the threshold value, in other words, when the reception strength of the BSSID is determined to be large, Step s4 is executed and the user 9 is determined to be located indoors. Subsequently, the indoor specification-related processing is finished. When the electronic apparatus 10 held by the user 9 located in a building receives the BSSID from the access point in the building, there is a high possibility that the reception strength of the BSSID is large. In the meanwhile, when the electronic apparatus 10 held by the user 9 located outside a building receives the BSSID from the access point in the building, there is a high possibility that the reception strength of the BSSID is small. Accordingly, when the position of the electronic apparatus 10 at the time of receiving the BSSID is located within the predetermined range from the position indicated by the registered positional information and when the reception strength of the BSSID is large, the user 9 is determined to be located indoors, thus the indoor determination can be performed more correctly.

In Step s41, it may be determined whether or not the reception strength of the BSSID is larger than the threshold value. In this case, when the reception strength of the BSSID is equal to or smaller than the threshold value, the indoor specification-related processing is finished. Then, when the reception strength of the BSSID is larger than the threshold value, the location of the user 9 is determined to be "indoor" in Step s4.

The threshold value used in Step s41 may be determined based on the reception strength of the BSSID received when the registered positional information is stored in the storage 103, that is to say, the reception strength of the BSSID received in Step s11 in FIG. 8 described above or Step s21 in FIGS. 10 and 11, or by the other standard.

As described above, the indoor specifying unit 420 performs the indoor specification based on the determination result whether or not the position indicated by the obtained positional information is located within the predetermined range from the position indicated by the registered positional information and the reception strength of the BSSID, thus it can be specified more correctly that the user 9 is located indoors.

It is also applicable that the registered positional information is not the positional information indicating the position of the electronic apparatus 10 at the time of receiving the BSSID but the positional information indicating the position of the access point to which the BSSID is allocated in the case where the electronic apparatus 10 receives the BSSID. In this case, for example, when the electronic apparatus 10 in the registration mode located in the room 722 illustrated in FIG. 7 described above receives the BSSID in Step s1 described above, the positional information indicating the position of the access point 804 in the room 722 is registered in the storage 103 as the registered positional information.

When there is a server device including a database in which the BSSID of the access point and the positional information indicating the position of the access point are registered in association with each other, the electronic apparatus 10 can obtain, from the server device, the positional information indicating the position of the access point transmitting the BSSID. For example, when the operation unit 210 receives the registration instruction operation in Step s13 in FIG. 8 described above, the electronic apparatus 10 obtains, from the server device, the positional information indicating the position of the access point to which the BSSID received in Step s11 is allocated. When the registration processing illustrated in FIGS. 10 to 12 described above is executed, the electronic apparatus 10 obtains, from the server device, the positional information indicating the position of the access point to which the BSSID received in Step s21 is allocated, for example, in Step s23.

When the access point transmits the positional information indicating the position of the access point with the BSSID, the electronic apparatus 10 can obtain the positional information indicating the position of the access point to which the BSSID is allocated at the time of receiving the BSSID.

The positional information obtained in Step s2 may be the positional information indicating the position of the access point to which the BSSID received in Step s1 is allocated. When there is the server device including the database as described above, the electronic apparatus 10 can obtain, from the server device, the positional information indicating the position of the access point to which the BSSID received in Step s1 is allocated. When the access point transmits the positional information indicating the position of the access point with the BSSID, the electronic apparatus 10 can obtain the positional information indicating the position of the access point to which the BSSID is allocated at the time of receiving the BSSID in Step s1.

It is also applicable that the registered positional information is the positional information indicating the position of the access point to which the BSSID is allocated in the case where the electronic apparatus 10 receives the BSSID and the positional information obtained in Step s2 is the positional information indicating the position of the electronic apparatus 10 at the time of receiving the BSSID. It is also applicable that the registered positional information is the positional information indicating the position of the electronic apparatus 10 at the time of receiving the BSSID and the positional information obtained in Step s2 is the positional information indicating the position of the access point to which the BSSID is allocated in the case where the electronic apparatus 10 receives the BSSID. Since the position of the access point and the position of the electronic apparatus 10 receiving the BSSID from the access point are close to each other, the type of the registered positional information and the type of the positional information obtained in Step s2 may be different from each other.

An extended SSID (ESSID) may be used instead of the BSSID in each example described above. Herein, the ESSID is identification information allocated to the access point separately from the BSSID. The ESSID is also referred to as a network name in some cases. A user of the access point can change contents of the network name allocated to the access point. The access point can wirelessly transmit the BSSID and the network name allocated thereto at regular intervals in a broadcast form, for example. The electronic apparatus 10 can receive both the BSSID and the network name from the access point.

In the example described above, the indoor specification is performed using the BSSID or the network name with wireless LAN. When the communication device in which the wireless communication unit 110 can perform the wireless communication transmits the identification information allocated to the communication device in the manner similar to the BSSID or the network name, the indoor specification can be performed similarly using the identification information instead of the BSSID or the network name.

Although the electronic apparatus 10 is a mobile phone, such as a smartphone, in the above-mentioned examples, the electronic apparatus 10 may be the other types of electronic apparatuses. The electronic apparatus 10 may be a tablet terminal, a personal computer, and a wearable apparatus, for example. The wearable apparatus used as the electronic apparatus 10 may be an apparatus wearable on the wrist, such as a wristband apparatus and a wristwatch apparatus, an apparatus wearable on the head, such as a headband apparatus and an eyeglasses apparatus, and an apparatus wearable on the body, such as a clothing apparatus.

While the electronic apparatus 10 has been described above in detail, the above description is in all aspects illustrative and not restrictive. The various modifications described above are applicable in combination as long as they are not mutually inconsistent. It is understood that numerous modifications which have not been exemplified can be devised without departing from the scope of the present disclosure.

The invention claimed is:

1. An electronic apparatus, comprising:
    a transceiver configured to perform wireless communication with a first communication device transmitting first identification information and a second communication device transmitting second identification information;
    a storage configured to store, as registered positional information, first positional information indicating a position of the first communication device or a position of the electronic apparatus at a time when the transceiver receives the first identification information from the first communication device; and
    at least one processor configured to:
        in a case that the transceiver receives the second identification information from the second communication device, perform determination processing of determining whether or not a position of the second communication device or a position of the electronic apparatus at a time when the transceiver receives the second identification information from the second communication device is located within a predetermined range from the position indicated by the registered positional information; and
        perform an indoor specification for specifying that a user of the electronic apparatus is located indoors based on a determination result in the determination processing, wherein
    the at least one processor is configured to:
        in response to specifying that the electronic apparatus is located outdoors, cause the transceiver to transmit presence notification information notifying another electronic apparatus of a proximity of the electronic apparatus; and
        in response to specifying that the electronic apparatus is located indoors, suppress the transmission of the presence notification information.

2. The electronic apparatus according to claim 1, wherein the at least one processor performs the indoor specification based on the determination result and a reception strength of the second identification information transmitted from the second communication device.

3. The electronic apparatus according to claim 1, wherein the at least one processor determines whether or not the electronic apparatus transmits a notification outside the electronic apparatus based on a result of the indoor specification.

4. The electronic apparatus according to claim 1, wherein the storage is configured to store the first positional information as the registered positional information in response to receiving an instruction operation instructing the electronic apparatus to store the first positional information as the registered positional information from the user at a time when the transceiver receives the first identification information from the first communication device.

5. The electronic apparatus according to claim 1, wherein the at least one processor is configured to determine whether or not the electronic apparatus is stopping, and the storage is configured to store the first positional information as the registered positional information in response to determining that the transceiver receives the first identification information at a time when the electronic apparatus is stopping.

6. The electronic apparatus according to claim 1, wherein the storage is configured to store the first positional information as the registered positional information in response to determining that the transceiver receives the first identification information within a predetermined time period.

7. The electronic apparatus according to claim 1, wherein in a case that the electronic apparatus specifies that the electronic apparatus is located outdoors, the electronic apparatus transmits information regarding the user from the transceiver.

8. The electronic apparatus according to claim 7, comprising
at least one sensor, wherein
after the electronic apparatus specifies that the electronic apparatus is located outdoors, the electronic apparatus transmits the information regarding the user from the transceiver in accordance with a detection result of the at least one sensor.

9. The electronic apparatus according to claim 7, wherein the transceiver can transmit the information regarding the user to a vehicle.

10. The electronic apparatus according to claim 7, wherein
the transceiver can transmit the information regarding the user to a roadside unit.

11. The electronic apparatus according to claim 1, wherein
in a case that the electronic apparatus specifies that the electronic apparatus is located indoors, the electronic apparatus suppresses a transmission of information regarding the user from the transceiver.

12. The electronic apparatus according to claim 11, wherein
the transceiver can transmit the information regarding the user to a vehicle.

13. The electronic apparatus according to claim 11, wherein
the transceiver can transmit the information regarding the user to a roadside unit.

14. The electronic apparatus according to claim 1, further comprising
at least one sensor, wherein
in a case that the electronic apparatus specifies that the electronic apparatus is located outdoors, the electronic apparatus transmits the presence notification information from the transceiver in accordance with a detection result of the at least one sensor.

15. The electronic apparatus according to claim 1, wherein
the transceiver is configured to transmit the presence notification information to a vehicle.

16. The electronic apparatus according to claim 1, wherein
the transceiver is configured to transmit the presence notification information to a roadside unit.

17. A control device being included in an electronic apparatus, which can perform wireless communication with a first communication device transmitting first identification information and a second communication device transmitting second identification information, for controlling an operation of the electronic apparatus, wherein
the electronic apparatus stores, as registered positional information, first positional information indicating a position of the first communication device or a position of the electronic apparatus at a time when the electronic apparatus receives the first identification information from the first communication device, and
the control device comprises at least one processor configured to:
in a case that the electronic apparatus receives the second identification information from the second communication device, perform determination processing of determining whether or not a position of the second communication device or a position of the electronic apparatus at a time when the electronic apparatus receives the second identification information from the second communication device is located within a predetermined range from the position indicated by the registered positional information; and
perform an indoor specification for specifying that a user of the electronic apparatus is located indoors based on a determination result in the determination processing, wherein
the at least one processor is configured to:
in response to specifying that the electronic apparatus is located outdoors, cause the electronic apparatus to transmit first information regarding the user of the electronic apparatus; and
in response to specifying that the electronic apparatus is located indoors, cause the electronic apparatus to transmit second information indicating a low risk of the user running out into a roadway.

18. A computer-readable non-transitory recording medium storing a control program for controlling an electronic apparatus which can perform wireless communication with a first communication device transmitting first identification information and a second communication device transmitting second identification information, wherein
the electronic apparatus stores, as registered positional information, first positional information indicating a position of the first communication device or a position of the electronic apparatus at a time when the electronic apparatus receives the first identification information from the first communication device, and
the control program makes the electronic apparatus execute:
in a case that the electronic apparatus receives the second identification information from the second communication device, determination processing of determining whether or not a position of the second communication device or a position of the electronic apparatus at a time when the electronic apparatus receives the second identification information from the second communication device is located within a predetermined range from the position indicated by the registered positional information; and
an indoor specification for specifying that a user of the electronic apparatus is located indoors based on a determination result in the determination processing, wherein in response to specifying that the electronic apparatus is located outdoors, the electronic apparatus transmits information regarding the user of the electronic apparatus depending on a movement state of the user, and in response to specifying that the electronic apparatus is located indoors, the electronic apparatus suppresses the transmission of the information regarding the user.

* * * * *

EX PARTE REEXAMINATION CERTIFICATE (197th)
Ex Parte Reexamination Ordered under 35 U.S.C. 257

United States Patent
Ueno et al.

(10) Number: US 10,645,535 C1
(45) Certificate Issued: *Jul. 29, 2021

(54) ELECTRONIC APPARATUS, CONTROL DEVICE AND COMPUTER-READABLE NON-TRANSITORY RECORDING MEDIUM FOR SELECTIVELY TRANSMITTING INFORMATION BASED ON INDOOR/OUTDOOR SPECIFICATION

(71) Applicant: KYOCERA Corporation, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP)

(73) Assignee: KYOCERA CORPORATION, Kyoto (JP)

Supplemental Examination Request:
No. 96/000,345, Dec. 21, 2020

Reexamination Certificate for:
Patent No.: 10,645,535
Issued: May 5, 2020
Appl. No.: 16/416,303
Filed: May 20, 2019

(*) Notice: This patent is subject to a terminal disclaimer.

Related U.S. Application Data

(63) Continuation of application No. PCT/JP2017/040691, filed on Nov. 13, 2017.

(30) Foreign Application Priority Data

Nov. 25, 2016 (JP) .................................. 2016-229298

(51) Int. Cl.
H04W 4/44 (2018.01)
G08G 1/01 (2006.01)
(Continued)

(52) U.S. Cl.
CPC .............. *H04W 4/44* (2018.02); *G08G 1/005* (2013.01); *G08G 1/01* (2013.01); *G08G 1/0129* (2013.01);
(Continued)

(58) Field of Classification Search
None
See application file for complete search history.

(56) References Cited

To view the complete listing of prior art documents cited during the supplemental examination proceeding and the resulting reexamination proceeding for Control Number 96/000,345, please refer to the USPTO's public Patent Application Information Retrieval (PAIR) system under the Display References tab.

*Primary Examiner* — Charles R Craver

(57) ABSTRACT

A communication unit can perform a wireless communication with a plurality of communication devices each transmitting allocated identification information. A storage stores, as registered positional information, positional information indicating a position of a first communication device included in the plurality of the communication devices or a position of the electronic apparatus at a time when the communication unit receives the identification information transmitted from the first communication device. A first determiner determines whether or not a position of a second communication device included in the plurality of the communication devices or a position of the electronic apparatus at a time when the communication unit receives the identification information transmitted from the second communication device is located within a predetermined range from the position indicated by the registered positional information in a case where the communication unit receives the identification information transmitted from the second communication device. An indoor specifying unit performs an indoor specification for specifying that a user of the electronic apparatus is located indoors based on a determination result in the first determiner.

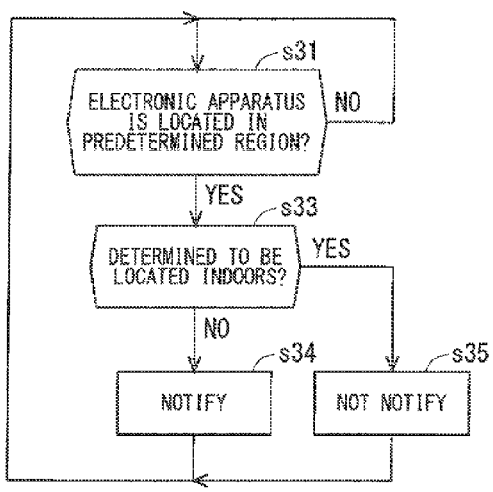

(51) Int. Cl.
*H04M 1/00* (2006.01)
*H04W 64/00* (2009.01)
*G08G 1/16* (2006.01)
*H04W 48/04* (2009.01)
*H04W 4/90* (2018.01)
*H04M 1/72412* (2021.01)
*H04W 4/40* (2018.01)
*G08G 1/0967* (2006.01)
*H04W 4/029* (2018.01)
*H04W 4/33* (2018.01)
*H04W 4/02* (2018.01)
*G08G 1/005* (2006.01)
*G08G 1/09* (2006.01)
*H04W 24/08* (2009.01)

(52) U.S. Cl.
CPC ......... *G08G 1/09* (2013.01); *G08G 1/096783* (2013.01); *G08G 1/096791* (2013.01); *G08G 1/16* (2013.01); *G08G 1/161* (2013.01); *G08G 1/163* (2013.01); *G08G 1/166* (2013.01); *H04M 1/00* (2013.01); *H04M 1/72412* (2021.01); *H04W 4/02* (2013.01); *H04W 4/029* (2018.02); *H04W 4/33* (2018.02); *H04W 4/40* (2018.02); *H04W 4/90* (2018.02); *H04W 48/04* (2013.01); *H04W 64/00* (2013.01); *H04W 24/08* (2013.01)

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3, 17 and 18 are determined to be patentable as amended.

Claims 4-16, dependent on an amended claim, are determined to be patentable.

1. An electronic apparatus, comprising:
    a transceiver configured to perform wireless communication with a first communication device transmitting first identification information and a second communication device transmitting second identification information;
    a storage configured to store, as registered positional information, first positional information indicating a position of the first communication device or a position of the electronic apparatus at a time when the transceiver receives the first identification information from the first communication device; and
    at least one processor configured to:
    in a case that the transceiver receives the second identification information from the second communication device, perform determination processing of determining whether or not a position of the second communication device or a position of the electronic apparatus at a time when the transceiver receives the second identification information from the second communication device is located within a predetermined range from the position indicated by the registered positional information; and
    [perform an indoor specification for specifying] *specify* that a user of the electronic apparatus is located indoors based on a determination result in the determination processing, wherein
    the at least one processor is configured to:
    in response to *not* specifying that the electronic apparatus is located [outdoors] *indoors based on the determination result*, cause the transceiver to transmit presence notification information notifying another electronic apparatus of a proximity of the electronic apparatus; and
    in response to specifying that the electronic apparatus is located indoors *based on the determination result*, suppress the transmission of the presence notification information *and cause the transceiver to transmit information indicating a low risk of the user running out into a roadway.*

2. The electronic apparatus according to claim 1, wherein the at least one processor [performs the indoor specification] *specifies that the user of the electronic apparatus is located indoors* based on the determination result and a reception strength of the second identification information transmitted from the second communication device.

3. The electronic apparatus according to claim 1, wherein the at least one processor determines whether or not the electronic apparatus transmits a notification outside the electronic apparatus based on a result of [the indoor specification] *specifying that the user of the electronic apparatus is located indoors.*

17. A control device being included in an electronic apparatus, which can perform wireless communication with a first communication device transmitting first identification information and a second communication device transmitting second identification information, for controlling an operation of the electronic apparatus, wherein
    the electronic apparatus stores, as registered positional information, first positional information indicating a position of the first communication device or a position of the electronic apparatus at a time when the electronic apparatus receives the first identification information from the first communication device, and
    the control device comprises at least one processor configured to:
    in a case that the electronic apparatus receives the second identification information from the second communication device, perform determination processing of determining whether or not a position of the second communication device or a position of the electronic apparatus at a time when the electronic apparatus receives the second identification information from the second communication device is located within a predetermined range from the position indicated by the registered positional information; and
    [perform an indoor specification for specifying] *specify* that a user of the electronic apparatus is located indoors based on a determination result in the determination processing, wherein
    the at least one processor is configured to:
    in response to *not* specifying that the electronic apparatus is located [outdoors] *indoors based on the determination result*, cause the electronic apparatus to transmit first information regarding the user of the electronic apparatus; and
    in response to specifying that the electronic apparatus is located indoors *based on the determination result*, cause the electronic apparatus to transmit second information indicating a low risk of the user running out into a roadway.

18. A computer-readable non-transitory recording medium storing a control program for controlling an electronic apparatus which can perform wireless communication with a first communication device transmitting first identification information and a second communication device transmitting second identification information, wherein
    the electronic apparatus stores, as registered positional information, first positional information indicating a position of the first communication device or a position of the electronic apparatus at a time when the electronic apparatus receives the first identification information from the first communication device, and
    the control program makes the electronic apparatus execute:
    in a case that the electronic apparatus receives the second identification information from the second communication device, determination processing of determining whether or not a position of the second communication device or a position of the electronic apparatus at a time when the electronic apparatus receives the second identification information from the second communication device is located within a predetermined range from the position indicated by the registered positional information; and

[an indoor] *a* specification [for specifying] that a user of the electronic apparatus is located indoors based on a determination result in the determination processing, wherein in response to *not* specifying that the electronic apparatus is located indoors [outdoors] *based on the determination result*, the electronic apparatus transmits information regarding the user of the electronic apparatus depending on a movement state of the user, and in response to specifying that the electronic apparatus is located indoors *based on the determination result*, the electronic apparatus suppresses the transmission of the information regarding the user;

*wherein the electronic apparatus is configured to store the first positional information as the registered positional information in response to determining that the transceiver receives the first identification information within a predetermined time period.*

\* \* \* \* \*